(12) United States Patent
Wallach

(10) Patent No.: US 11,507,374 B2
(45) Date of Patent: *Nov. 22, 2022

(54) TRUE/FALSE VECTOR INDEX REGISTERS AND METHODS OF POPULATING THEREOF

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,495

(22) Filed: May 20, 2019

(65) Prior Publication Data

US 2020/0371801 A1 Nov. 26, 2020

(51) Int. Cl.
*G06F 9/30* (2018.01)
*G06F 15/80* (2006.01)

(52) U.S. Cl.
CPC ...... *G06F 9/30101* (2013.01); *G06F 9/30036* (2013.01); *G06F 9/30043* (2013.01); *G06F 15/8053* (2013.01)

(58) Field of Classification Search
CPC ............. G06F 9/30101; G06F 15/8053; G06F 9/30036; G06F 9/30043; G06F 9/34; G06F 9/3824; G06F 9/30018; G06F 9/30021; G06F 9/30032
USPC ................................ 712/220, 224, 225, 226
See application file for complete search history.

(56) References Cited

U.S. PATENT DOCUMENTS

| | | | |
|---|---|---|---|
| 5,226,171 A | 7/1993 | Hall et al. | |
| 5,511,210 A * | 4/1996 | Nishikawa | G06F 15/8084 712/2 |
| 6,269,435 B1 | 7/2001 | Dally et al. | |
| 6,334,176 B1 | 12/2001 | Scales, III et al. | |
| 7,793,084 B1 | 9/2010 | Mimar | |
| 11,281,464 B2 | 3/2022 | Anderson et al. | |
| 11,327,862 B2 | 5/2022 | Wallach | |
| 11,340,904 B2 | 5/2022 | Wallach | |
| 2002/0087846 A1 | 7/2002 | Nickolls et al. | |
| 2004/0006681 A1 | 1/2004 | Moreno et al. | |
| 2004/0153623 A1 | 8/2004 | Buchty et al. | |
| 2004/0250044 A1 | 12/2004 | Isomura | |
| 2006/0136700 A1 | 6/2006 | Barlow et al. | |
| 2006/0184765 A1 * | 8/2006 | Krueger | G06F 7/76 712/4 |
| 2007/0033381 A1 | 2/2007 | Wilson | |

(Continued)

FOREIGN PATENT DOCUMENTS

WO 2019011653 A1 1/2019

OTHER PUBLICATIONS

International Search Report and Written Opinion, PCT/US2020/028805, dated Jul. 28, 2020.

(Continued)

*Primary Examiner* — Shawn Doman
(74) *Attorney, Agent, or Firm* — Greenberg Traurig

(57) ABSTRACT

Disclosed herein are vector index registers for storing or loading indexes of true and/or false results of comparison operations in vector processors. Each of the vector index registers store multiple addresses for accessing multiple positions in operand vectors.

16 Claims, 17 Drawing Sheets

(56) References Cited

U.S. PATENT DOCUMENTS

| | | |
|---|---|---|
| 2008/0016320 A1 | 1/2008 | Menon et al. |
| 2008/0046683 A1* | 2/2008 | Codrescu ............. G06F 9/3885 712/7 |
| 2010/0274988 A1 | 10/2010 | Mimar |
| 2010/0312988 A1 | 12/2010 | Björklund et al. |
| 2012/0060020 A1* | 3/2012 | Gonion ............. G06F 9/30036 712/222 |
| 2012/0166761 A1* | 6/2012 | Hughes ............. G06F 9/30032 712/7 |
| 2013/0166516 A1* | 6/2013 | Reid ................ G06F 9/30036 707/690 |
| 2013/0185538 A1 | 7/2013 | Hung et al. |
| 2013/0212354 A1 | 8/2013 | Mimar |
| 2013/0246759 A1* | 9/2013 | Bradbury ............ G06F 9/30185 712/222 |
| 2013/0262833 A1 | 10/2013 | Gonion |
| 2014/0013075 A1 | 1/2014 | Hagog et al. |
| 2014/0019715 A1* | 1/2014 | Ould-Ahmed-Vall ....................... G06F 9/30036 712/5 |
| 2014/0189293 A1* | 7/2014 | Gopai ................ G06F 9/30021 712/7 |
| 2014/0189323 A1* | 7/2014 | Bharadwaj .......... G06F 9/30098 712/224 |
| 2014/0281425 A1 | 9/2014 | Valentine et al. |
| 2015/0046671 A1* | 2/2015 | Ould-Ahmed-Vall ....................... G06F 9/30109 712/4 |
| 2016/0011873 A1 | 1/2016 | Plotnikov |
| 2016/0026607 A1 | 1/2016 | Codrescu et al. |
| 2016/0092218 A1 | 3/2016 | Gonion |
| 2016/0092398 A1 | 3/2016 | Gonion et al. |
| 2016/0124651 A1 | 5/2016 | Sankaranarayanan et al. |
| 2016/0179520 A1 | 6/2016 | Jha et al. |
| 2016/0179526 A1* | 6/2016 | Jha ...................... G06F 9/30101 712/5 |
| 2016/0179537 A1 | 6/2016 | Kunzman et al. |
| 2017/0177356 A1 | 6/2017 | Ould-Ahmed-Vall et al. |
| 2017/0177359 A1 | 6/2017 | Ould-Ahmed-Vall |
| 2017/0177363 A1* | 6/2017 | Yount ................ G06F 12/0862 |
| 2017/0185412 A1* | 6/2017 | Mishra ................ G06F 9/3004 |
| 2017/0308141 A1 | 10/2017 | Anderson et al. |
| 2018/0060072 A1 | 3/2018 | Derby et al. |
| 2019/0004797 A1 | 1/2019 | Zbiciak et al. |
| 2019/0004814 A1 | 1/2019 | Chen et al. |
| 2019/0042253 A1* | 2/2019 | Eyole ................ G06F 9/30145 |
| 2019/0196825 A1 | 6/2019 | Grocutt et al. |
| 2019/0205137 A1 | 7/2019 | Meadows et al. |
| 2019/0340054 A1 | 11/2019 | Boettcher et al. |
| 2019/0377690 A1 | 12/2019 | Anderson et al. |
| 2020/0210199 A1* | 7/2020 | Ould-Ahmed-Vall ....................... G06F 9/3001 |
| 2020/0225953 A1 | 7/2020 | Magklis et al. |
| 2020/0371792 A1 | 11/2020 | Wallach |
| 2020/0371802 A1 | 11/2020 | Wallach |
| 2020/0371886 A1 | 11/2020 | Wallach |
| 2020/0372099 A1 | 11/2020 | Anderson et al. |
| 2021/0216318 A1 | 7/2021 | Langhammer et al. |
| 2021/0216319 A1 | 7/2021 | Zbiciak et al. |
| 2021/0294605 A1 | 9/2021 | Plotnikov et al. |
| 2021/0357218 A1 | 11/2021 | Anderson et al. |

OTHER PUBLICATIONS

International Search Report and Written Opinion, PCT/US2020/028806, dated Jul. 28, 2020.

International Search Report and Wirtten Opinion, PCT/US2020/028798, dated Jul. 30, 2020.

International Search Report and Wirtten Opinion, PCT/US2020/028799, dated Jul. 30, 2020.

\* cited by examiner

600

```
┌─────────────────────────────────────────────────────────────────────┐
│ storing, in an operand vector register (OVR) in a vector processor, │
│ elements of an operand vector to be used as input for a vector       │
│ operation of an ALU in the vector processor                          │
│ 602                                                                  │
└─────────────────────────────────────────────────────────────────────┘
                              │
                              ▼
┌─────────────────────────────────────────────────────────────────────┐
│ storing, in a vector index register (VIR) in the vector processor,  │
│ a plurality of address components corresponding to a plurality of    │
│ positions in the OVR                                                 │
│ 604                                                                  │
└─────────────────────────────────────────────────────────────────────┘
                              │
                              ▼
┌─────────────────────────────────────────────────────────────────────┐
│ iterating on the plurality of address components stored in the VIR  │
│ according to a count from a counter to provide an output             │
│ 606                                                                  │
└─────────────────────────────────────────────────────────────────────┘
                              │
                              ▼
┌─────────────────────────────────────────────────────────────────────┐
│ receiving, by a N:1 multiplexor of the processor, at least the count│
│ and the output from the VIR                                          │
│ 608                                                                  │
└─────────────────────────────────────────────────────────────────────┘
                              │
                              ▼
┌─────────────────────────────────────────────────────────────────────┐
│ receiving, by the multiplexor, a selection input comprising a mode  │
│ value, the mode value being at least a value for selection of the    │
│ count or a value for selection of the output from the VIR            │
│ 610                                                                  │
└─────────────────────────────────────────────────────────────────────┘
                              │
                              ▼
┌─────────────────────────────────────────────────────────────────────┐
│ selecting, by the multiplexor, at least either the count or the     │
│ output from the VIR according to the received mode value             │
│ 612                                                                  │
└─────────────────────────────────────────────────────────────────────┘
                              │
                              ▼
┌─────────────────────────────────────────────────────────────────────┐
│ communicating the selection to a vector load-store unit of the      │
│ vector processor accessing the OVR                                   │
│ 614                                                                  │
└─────────────────────────────────────────────────────────────────────┘
                              │
                              ▼
┌─────────────────────────────────────────────────────────────────────┐
│ adding a count stored in a counter to an effective address for       │
│ accessing the OVR                                                    │
│ 616                                                                  │
└─────────────────────────────────────────────────────────────────────┘
                              │
                              ▼
┌─────────────────────────────────────────────────────────────────────┐
│ adding the address component of the VIR to an effective address     │
│ for accessing a corresponding position in the OVR                    │
│ 618                                                                  │
└─────────────────────────────────────────────────────────────────────┘
                              │
                              ▼
┌─────────────────────────────────────────────────────────────────────┐
│ accessing the OVR for the ALU, by the vector load-store unit,       │
│ according to step 616 or 618                                         │
│ 620                                                                  │
└─────────────────────────────────────────────────────────────────────┘
```

FIG. 6

TRUE/FALSE VECTOR INDEX REGISTERS AND METHODS OF POPULATING THEREOF

FIELD OF THE TECHNOLOGY

In general, at least some embodiments disclosed herein relate to vector processors. Also, at least some embodiments disclosed herein relate to registers in vector processors that store addresses for accessing vectors.

BACKGROUND

A vector processor can be or include a central processing unit (CPU) that implements an instruction set containing instructions that operate on arrays of data of commonly referred to as vectors. This is different from a scalar processor, wherein instructions operate on single data items. Vector processors can greatly improve performance on certain workloads over scalar processor, notably numerical simulation and similar tasks. Vector processors appeared in the early 1970s and where a large part of supercomputing design through the 1970s into the 1990s. The rapid fall in the price-to-performance ratio of more conventional microprocessor designs, such as scalar processor designs, as led to less development and manufacturing of vector processors.

In general, conventional CPUs (e.g., scalar based CPUs) are able to manipulate a few pieces of data at a time, at most. For instance, such CPUs have an instruction that essentially provide adding A to B and store the result in C. The data for A, B and C is usually pointed to by passing in an address to a memory location that holds the data. Decoding this address and getting the data out of the memory takes some time, during which the CPU can sit idle waiting for the requested data to show up.

To reduce the amount of time consumed by these steps, more contemporary CPUs use a technique known as instruction pipelining in which the instructions pass through several sub-units in turn. The first sub-unit reads the address and decodes it, the next fetches the values at those addresses, and the next does the math itself. With pipelining, the CPU starts decoding the next instruction even before the first has left the CPU, similar to an assembly line. This way, the address decoder, and other mentioned parts are simultaneously and constantly in use. Because of the pipelining, any instruction takes the same amount of time to complete.

Vector processors improve on pipelining by, instead of pipelining merely the instructions, such processors also pipeline the data itself. Thus, instead of constantly having to decode instructions and then fetch the data needed to complete the instructions, the vector processor reads a single instruction from memory. This allows for reduced decoding time and reduced power consumption (e.g., one decode with vector processors instead of multiple decodes).

Vector processors as well as other types of processors, such as the commonly used scalar processors, include index registers for modifying operand addresses during the run of a program or operation. Often indexes are used and beneficial for doing vector or array operations. The contents of an index register can be added to or subtracted from an immediate address to form an effective address of the actual data or operand. Commonly, instructions can test the index register and, if the test fails, the instructions can reset the start of the loop. Some instruction sets allow multiple index registers to be used.

In general, it is known to use scalar registers for indexing. In other words, it is known to use scalar index registers.

However, there are many limitations associated with using a scalar register for indexing. And, some of these limitations can curb the performance of a processor using the index register. For example, to access multiple positions of an operand vector, a scalar index register needs to be incremented and each incrementation needs to be separately loaded by the processor to be used for accessing the operand vector.

BRIEF DESCRIPTION OF THE DRAWINGS

The present disclosure will be understood more fully from the detailed description given below and from the accompanying drawings of various embodiments of the disclosure.

FIG. 6 illustrates example operations of method 600 for accessing elements of an operand vector, in accordance with some embodiments of the present disclosure.

DETAILED DESCRIPTION

Figure 1:
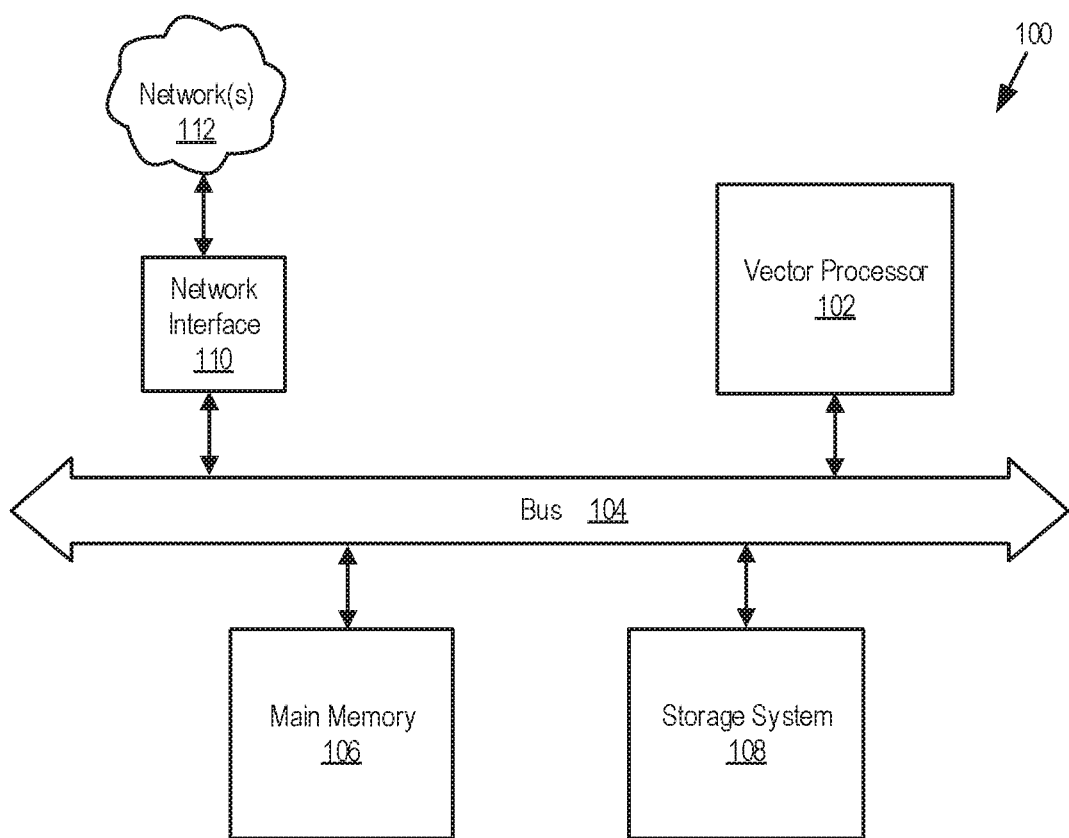
FIG. 1 illustrates example parts of an example computing device 100, in accordance with some embodiments of the present disclosure.

In general, at least some embodiments disclosed herein relate to vector processors. Also, at least some embodiments disclosed herein relate to registers in vector processors that store addresses for accessing vectors. And, at least some of the embodiments disclosed herein are vector index registers in vector processors that each store multiple addresses for accessing multiple positions in vectors.

It is known to use a scalar index register in a vector processor to reference multiple positions of vectors by changing the value stored in the scalar index register during a vector operation. However, by using a vector indexing register for indexing multiple positions of one or more operand vectors, the scalar index register can be replaced and at least the continual changing of values in the scalar index register during a vector operation can be avoided. This is just one example of a technical solution to a technical problem described herein.

A scalar or single-entry register can store an index i that allows the operation on a vector register to start at element i, or the operation can start at element zero. The subsequent parts of the operation access elements 0+1 or i+1 at each increment. On a side note, using a single-entry register that stores an index i can be used for vector first operations and indexing, which is also disclosed herein to some extent.

However, there are many limitations associated with using a scalar register or single-entry vector for indexing. And, some of these limitations can curb the performance of a vector processor using the index register. For example, to access multiple positions of an operand vector, a scalar or single-entry index register needs to be incremented and each incrementation needs to be separately loaded by the vector processor to be used for accessing the operand vector.

By using a vector indexing register for indexing a plurality of positions of one or more operand vectors, the scalar index register can be replaced and at least the continual changing of the scalar index register during a vector operation can be avoided.

In general, the embodiments disclosed herein provide specific technical solutions to at least the technical problems mentioned in the background section and other parts of the application as well as other technical problems not described herein but recognized by those of skill in the art.

In some embodiments, a vector index register (VIR) can store address components for vector operations that use selective indexing. This is somewhat analogous to vector first processing or indexing. For example, using selective indexing, a VIR can store address parts i_1, i_2, . . . , i_n. This allows the operations on a vector register to move through elements i_1, i_2, . . . , i_n of an input vector, instead of i, i+1, i+2, . . . i+n of the input vector. For example, using selective indexing, a VIR can store non-sequential address parts i_1, i_3, . . . , i_8. This allows the operations on a vector register to move through non-sequential elements of an input vector.

The uses of a VIR are many. For example, a VIR can be used to implement a vector compress or expand function more efficiently. For example, when a vector comparison operation generates an index vector of selected elements, the selected components can be loaded in the VIR that can be used for addressing in the generation of the compressed vector. The elements in the VIR (or the elements in VMX(i)) are address components for accessing non-continuous elements in vector V(i). Instead of accessing V(i) through a single-entry index vector, where i=i+1 for each iteration, the vector processor can sequentially access V(VMX(i)), where i=i+1 for each iteration. Also, this way the components are only loaded once from the VIR for use by the vector processor. If a single-entry index vector is used, such as a vector first register is used, the element in the input vector is addressed by a counter that starts with the value in the single-entry index vector. To use the single-entry index register, each address is loaded sequentially from the index register. Again, with a VIR, each address or address component stored in the VIR is loaded at the same time only once. This creates a significant performance boost for the vector processor using a VIR.

In some embodiments, a counter (e.g., counter register) can drive the VIR. Also, a multiplexor, such as an N:1 multiplexor (i.e., multiple input single output multiplexor), can be used to selectively switch between outputs of the counter, to generate the output to access a certain position of the operand register for each vector iteration, or the index coming out of VIR to access a certain position of the operand register for each iteration of the counter.

The aforesaid features and other features disclosed herein can be useful in conditional operations. For example, instead of generating the vector mask register for conditional operations on a vector, one of the circuits disclosed herein can generate one or more index vectors. Then, using the index vector(s), branches of a vector mask register can be evaluated via the corresponding VIR(s) respectively. The VIR(s) speed up the processing by the vector processor because the vector mask does not need to be generated or be iterated through, and the components of the mask do not need to be separately loaded per iteration.

Such functionality can also be useful for vector expand operations and/or merging the results of vector operations into a vector register. For example, a VIR can be used for indexing in operation B(VMX(i))=A(i), wherein "B(VMX (i)" is expand compressed vector A. Also, a VIR can be used for indexing in operation B(VMX(i))=A(i)+a, in which "B(VMX(i)" is expand compressed vector A and a scalar value "a" is added to expanded vector A. Also, a VIR can be used for indexing in operation B(VMX(i))=function (A(VMX(i)), C(VMX(i)), in which the processor preforms an operation on vectors A and C for elements selected through the VIR labeled "VMX". This is an example of conditional processing and can be used for nested conditional processing as well.

The index values or addressing components stored in a VIR (e.g., [2, 4, 5, 8]) for accessing elements within an operand vector register (OVR) can be converted to memory addresses (e.g., the base address plus increments for each memory unit). Thus, the outputs described herein, such as the outputs from the multiplexors described herein can be converted to memory addresses for accessing vectors in main memory directly, in a way similar to accessing operand vector registers (OVRs).

FIG. 1 illustrates example parts of an example computing device 100, in accordance with some embodiments of the present disclosure. The device 100 can be communicatively coupled to one or more networks 112, as shown. The device 100 includes a vector processor 102 that is in accordance with some embodiments of the present disclosure. The device 100 also includes at least a bus 104, a main memory 106, a data storage system 108, and a network interface 110. The bus 104 communicatively couples the vector processor 102, the main memory 106, the data storage system 108, and the network interface 110. The device 100 includes a computer system that includes at least vector processor 102, main memory 106 (e.g., read-only memory (ROM), flash memory, dynamic random access memory (DRAM) such as synchronous DRAM (SDRAM) or Rambus DRAM (RDRAM), static random access memory (SRAM), etc.), and data storage system 108, which communicate with each other via bus 104 (which can include multiple buses).

To put it another way, FIG. 1 is a block diagram of an example device 100 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 110) to other machines in a LAN, an intranet, an extranet, and/or the Internet (e.g., network(s) 112). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Vector processor 102 represents one or more vector processors that are in accordance with some embodiments of the present disclosure. The vector processor 102 can include a microprocessor, a central processing unit, or the like. More particularly, the vector processor 102 can include a complex instruction set computing (CISC) microprocessor, reduced instruction set computing (RISC) microprocessor, very long instruction word (VLIW) microprocessor, or a processor implementing other instruction sets, or processors implementing a combination of instruction sets, as long as the processor uses: vector instructions, vector registers, a vector first and multi-lane configuration. The vector processor 102 can also be one or more special-purpose processing devices such as an application specific integrated circuit (ASIC), a field programmable gate array (FPGA), a digital signal processor (DSP), graphics processing unit (GPU), network processor, or the like. The vector processor 102 can be configured to execute instructions for performing the operations and steps discussed herein. The vector processor 102 can further include a network interface device such as network interface 110 to communicate over one or more communications network (such as network(s) 112).

The data storage system 108 can include a machine-readable storage medium (also known as a computer-readable medium) on which is stored one or more sets of instructions or software and can embody at least some aspects of one or more of the methodologies or functions described herein. The data storage system 108 can include non-volatile storage. The instructions can also reside, completely or at least partially, within the main memory 106 and/or within the vector processor 102 during execution thereof by the computer system, the main memory 106 and the vector processor 102 also can constitute a machine-readable storage media. While the memory, vector processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 2:
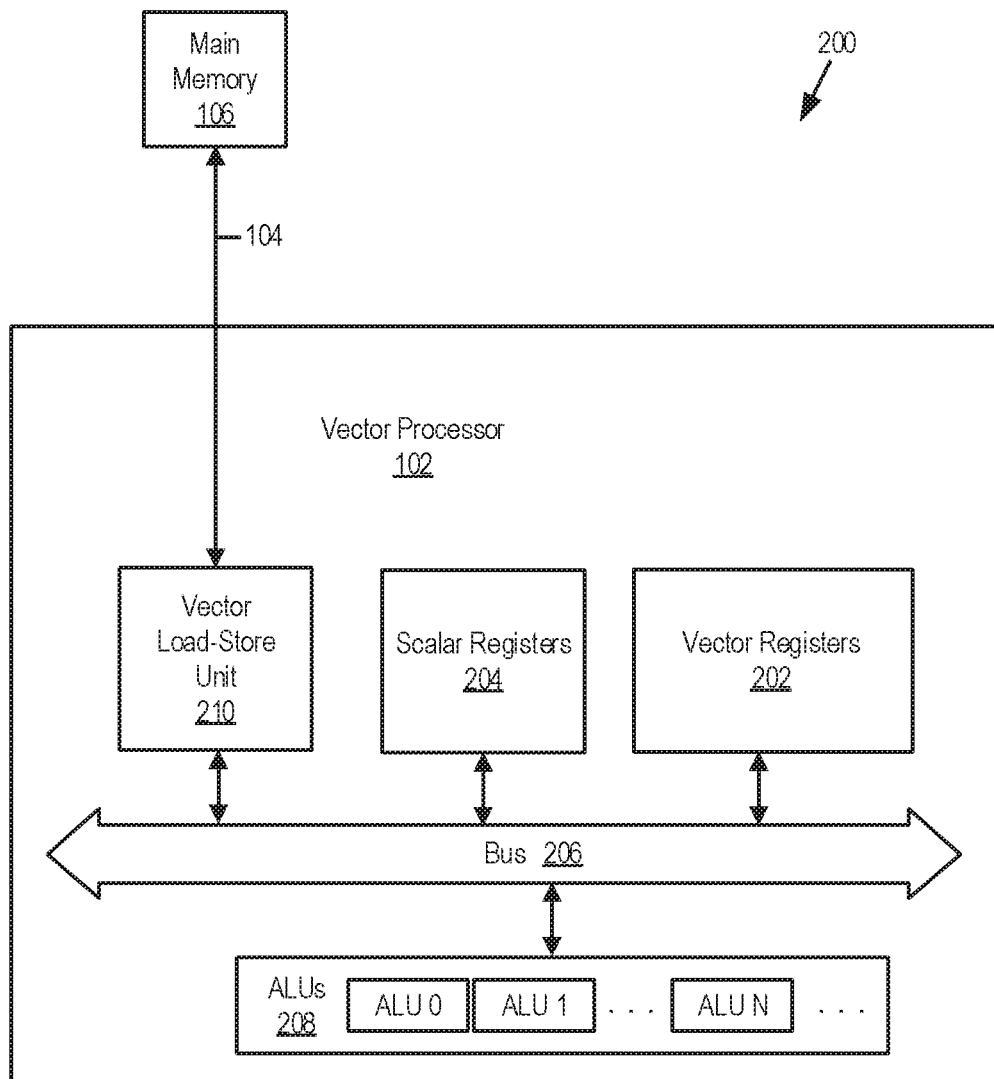
FIG. 2 illustrates example parts of an example computing device 200, in accordance with some embodiments of the present disclosure.

FIG. 2 illustrates example parts of an example computing device 200, in accordance with some embodiments of the present disclosure. As shown, computing device 200 includes vector processor 102 as well as bus 104 and main memory 106 (e.g., see FIG. 1). Computing device 200 can also be or include computing device 100.

As shown in FIG. 2, vector processor 102 includes vector registers 202, scalar registers 204, bus 206, arithmetic logic units 208 (ALUs 208), and vector load-store unit 210. Other embodiments of the computing device 200 can include the scalar registers 204 being external to the vector processor 102 or in a separate unit of the vector processor from a unit in the vector processor having the vector registers 202. The bus 206 communicatively couples vector registers 202, scalar registers 204, arithmetic logic units (ALUs) 208, and vector load-store unit 210, and such components can communicate with each other via bus 206 (which can include multiple buses). Vector registers 202 include multiple vector registers. And, ALUs 208 include multiple ALUs—e.g., arithmetic logic unit (ALU) 0, ALU 1, and ALU N.

Vector processor 102 includes at least one vector index register. Vector processor 102 can be or include one or more central processing units (CPUs) that implement instructions that operate on one-dimensional arrays of data called vectors.

Vector registers 202 in the vector processor 102 can include operand vector registers (i.e., input vector registers), result vector registers (i.e., output vector registers), and vector index registers that store values used for accessing elements in operand vector registers and/or result vector registers. The values in the accessed elements of operand vector registers and/or result vector registers can be used as input for ALUs such as one or more of the ALUs 208.

Figure 3:
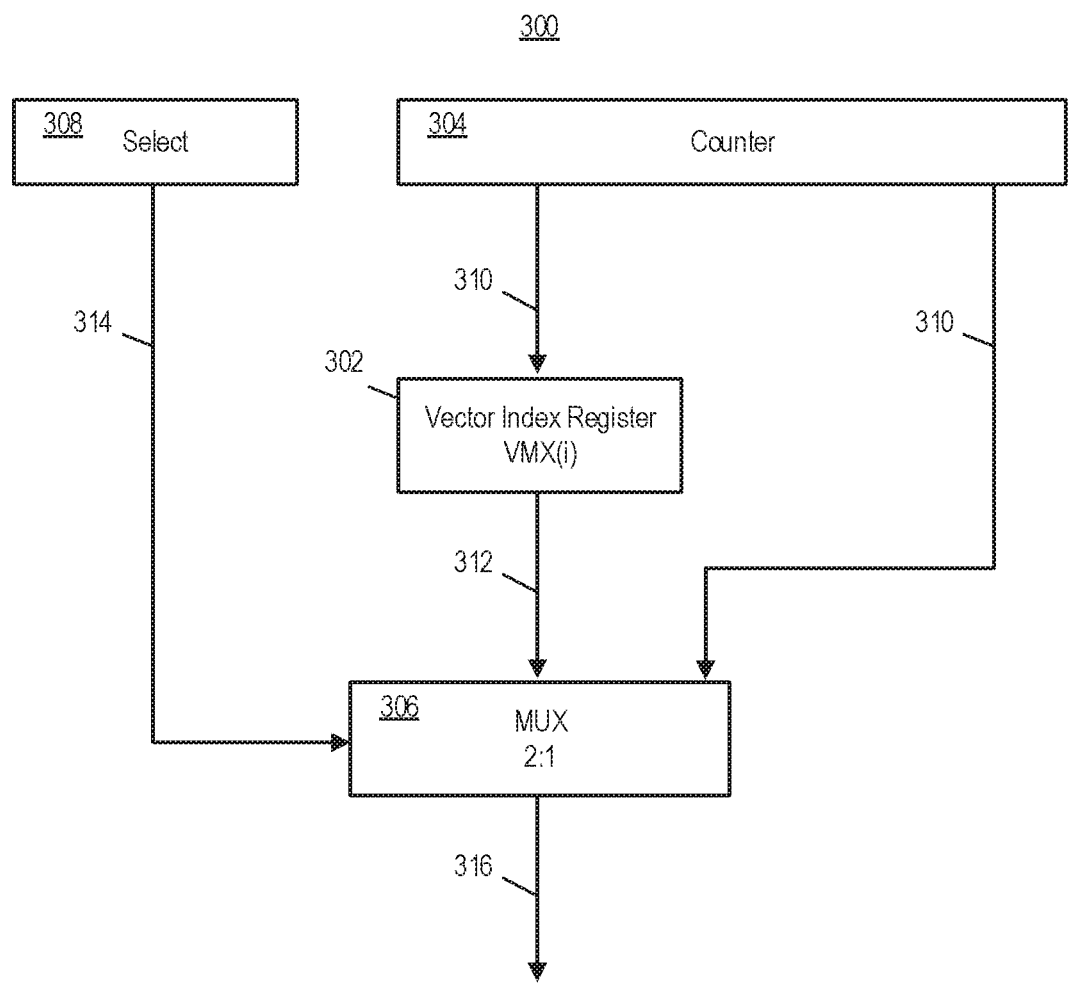
FIG. 3 illustrates an example system 300 including a vector index register 302, in accordance with some embodiments of the present disclosure.
Figure 4:
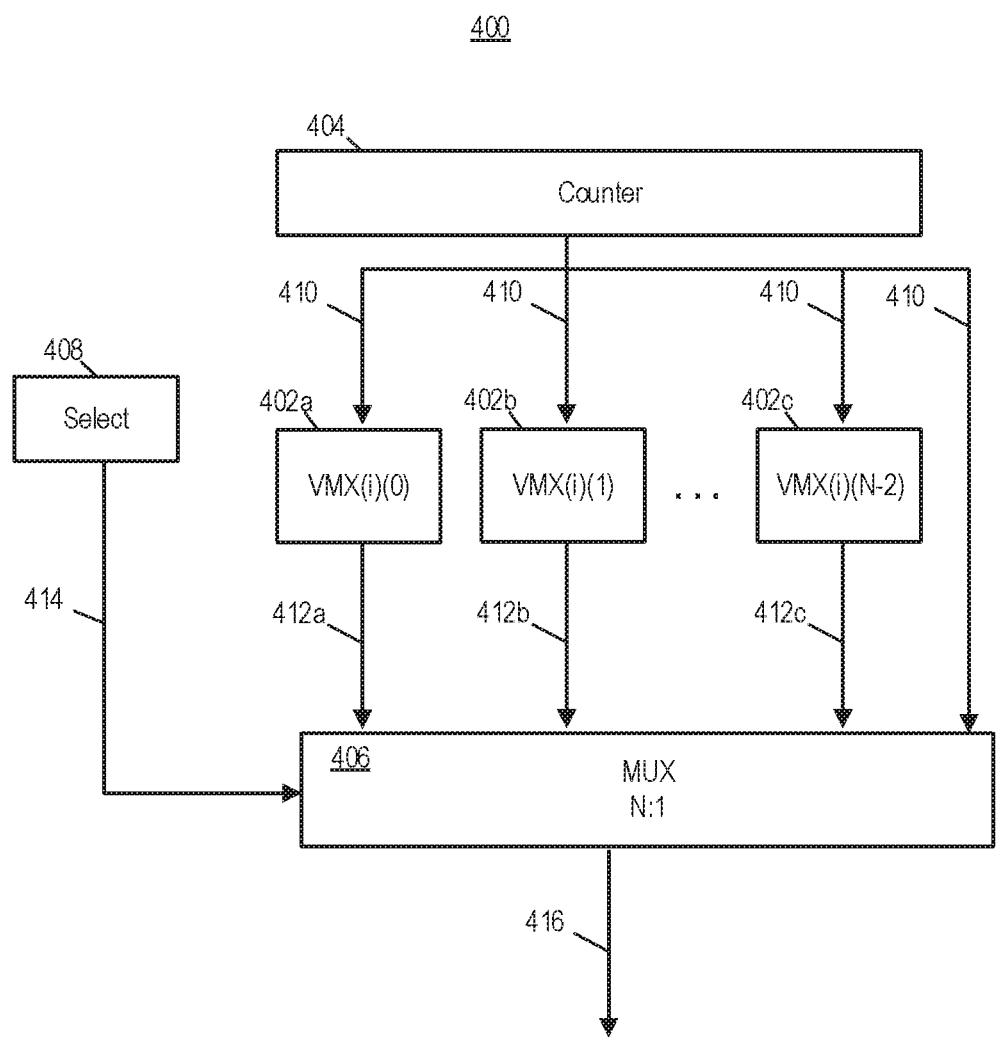
FIG. 4 illustrates an example system 400 including vector index registers 402a, 402b, and 402c, in accordance with some embodiments of the present disclosure.
Figure 5:
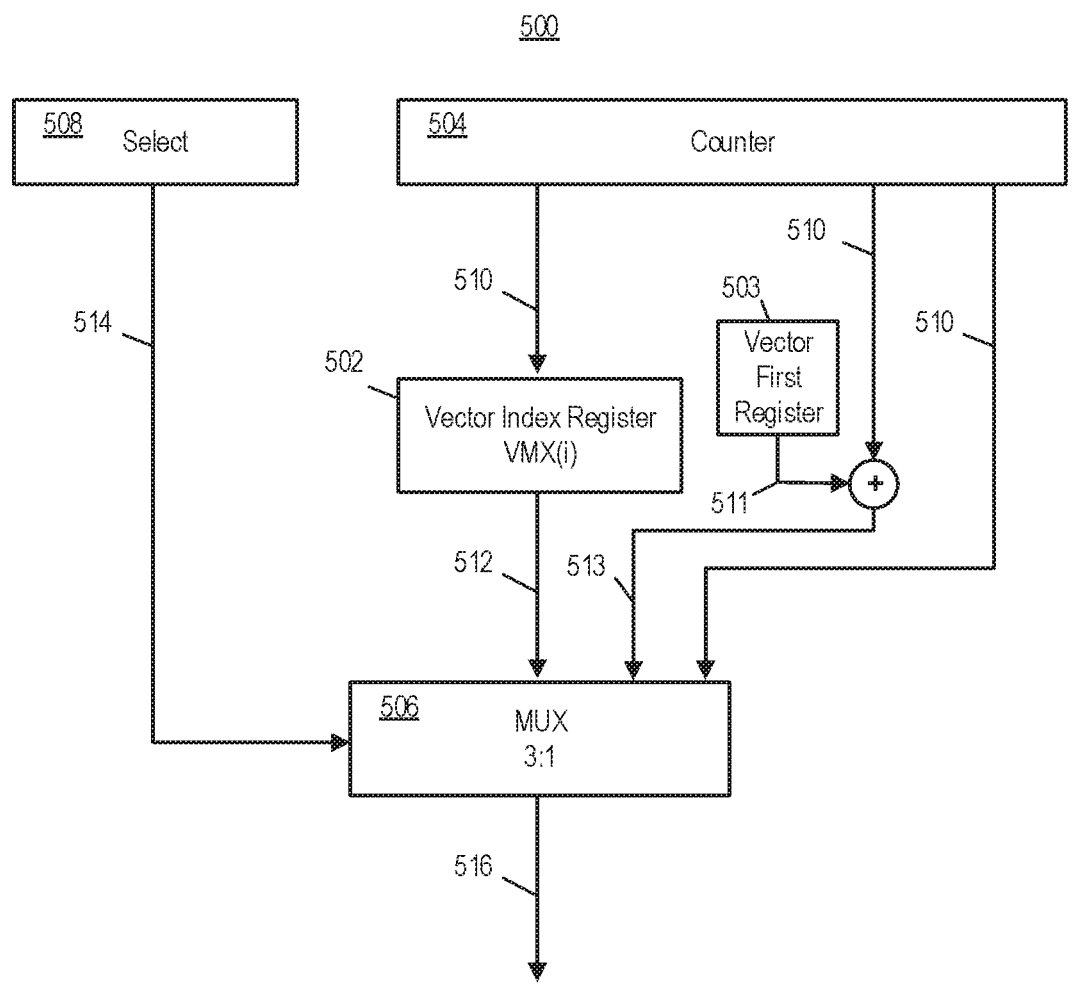
FIG. 5 illustrates an example system 500 including a vector index register 502 and a vector first register 503, in accordance with some embodiments of the present disclosure.

In general, the vector processor 102 can include index registers that can include scalar index registers and vector index registers such as the vector index registers illustrated in FIGS. 3, 4, and 5.

The scalar registers 204 of the vector processor 102 can include scalar index registers as well as operand scalar registers (i.e., input scalar registers) and result scalar resisters (i.e., output scalar registers). At least some of the scalar registers can provide indexing and control values for many different types of operations on scalars and vectors. Also, scalar registers can also provide numerical values used by the vector instructions. For example, a vector provided by a vector register can be multiplied by a scalar provided by a scalar register.

At least some of the scalar registers 204 and the vector registers 202 can be connected to respective ALUs of the ALUs 208. An ALU of ALUs 208 can include a combinational digital electronic circuit that performs arithmetic and bitwise operations on integer binary numbers. In the vector processor 102, an ALU of the ALUs 208 can be connected to input vector registers and in some instances output vector registers if the output vector register is providing feedback in an operation. In such instances the output vector register is both an input and output vector.

Also, the scalar registers 204 can include programmable scalar registers. A programmable scalar register can be used so that a vector provided by a vector register (e.g., one of the vector registers 202) can be operated on by a scalar provided by and programmed into one of the programmable scalar registers. For example, one of the operations can include a vector multiplied by a scalar value (e.g., vector A(i) X scalar p).

The bus 206 depicted can be configured to communicatively couple the vector load-store unit 210, the vector registers 202, the scalar registers 204, and the arithmetic logic units 208. The bus 206 can include a 2:1 multiplexor, 3:1 multiplexor, or a N:1 multiplexor configured to receive inputs from vector index registers and to output an address or address component for access of an operand vector. (e.g., see FIGS. 3, 4, and 5).

Vector load-store unit 210 includes circuitry for executing load and store instructions, generating addresses of load and store vector operations and loading data from memory or storing it back to memory from the registers of the vector processor 102. Vector load-store unit 210 can perform many of the operations described herein including many of the operations of methods 600, 700, 900, and 1000 in FIGS. 6-10.

Each of the computing devices described herein can be a machine capable of executing a set of instructions (sequential or otherwise) that specify actions to be taken by that machine. Further, while a single machine is illustrated for each of the illustrated computing devices of FIGS. 1 and 2, the term "machine" shall also be taken to include any collection of machines that individually or jointly execute a set (or multiple sets) of instructions to perform any one or more of the methodologies or operations discussed herein. And, each of the illustrated computing devices can each include at least a bus and/or motherboard, one or more controllers (such as one or more CPUs), a main memory that can include temporary data storage, at least one type of network interface, a storage system that can include permanent data storage, and/or any combination thereof.

Before the discussion of the systems 300, 400, and 500 depicted in FIGS. 3, 4, and 5, it is important to understand that elements in a vector register can be addressed using at least an index coming out of a vector index register (VIR) or another type of register such as a counter register. In general, when a counter register is used, the counter adds 1 to itself for each iteration or step in a DO or FOR loop that generates the address for the next iteration or step. The VIR does not have to be driven by a counter, but it can be useful to have the VIR driven by a counter. A common counter can do both of driving the VIR and can provide a separate input to a receiving multiplexor that outputs an address component for use in accessing an operand vector in a vector operation.

For example, a VIR can store a vector VMX, where VMX(i), and i=0, 1, . . . , n−1. A simple example of an application of use of the VIR would be a compress operation such as B(i)=A(VMX(i)). Also, when another vector register stores a vector A, its elements are A(i), where i= 0, 1, 2, . . . n. In a regular mode (such as when the counter output is selected for use by a multiplexor), the processor can do A+a, where "a" is a scaler from the counter via the multiplexor. The result is stored in an output vector register B, where B(i)=A(i)+a, and where i=0, 1, . . . , n−1. In the mode using the VIR (e.g., an alternative selection control of the multiplexor), the processor can do A(VMX)+a by using the addresses generated from the output of the VIR. Thus, the output vector register has B, where B(i)=A(VMX(i))+a, and where i=0, 1, . . . , n−1. Also, for example, the vector processor can be configured to operate on two vectors, e.g., B(i)=function (A(VMX(i)), C(VMX(i)), where the "function" is implemented via an ALU.

FIG. 3 illustrates an example system 300 including a vector index register 302, in accordance with some embodiments of the present disclosure.

The system 300 can be a part of vector processor 102 (e.g., see FIG. 1 or 2) or multiple vector processors. System 300 includes the vector index register 302 (VIR 302), a counter register 304, a 2:1 multiplexor 306, and a select register 308 connected to the multiplexor. The VIR 302 can be one of the vector registers 202 shown in FIG. 2. The counter register 304 and the select register 308 can be registers of the scalar registers 204. The 2:1 multiplexor 306 can be a part of the bus 206 shown in FIG. 2 or the bus 104 shown in FIG. 1.

The system 300 can be part of a vector processor that includes an arithmetic logic unit (ALU) of a plurality of arithmetic logic units (ALUs). The vector processor can also include an operand vector register (OVR) of a plurality of operand vector registers. The OVR can be configured to store elements of an operand vector to be used as input for a vector operation of the ALU.

The VIR 302 can be configured to store a plurality of address components corresponding to a plurality of positions in the OVR. Each address component can be addable to an effective address for accessing a corresponding position in the OVR. Each position of the OVR can include an element of the operand vector to be operated upon by the ALU.

In some embodiments, an example OVR can be 64 bits in length. If an operand is less than 64 bits (for example a 32-bit integer) that operand can be right justified. In such an example, the indexing techniques described herein are similarly applied. For example, the OVR can include padding in its elements to accommodate different data types.

As shown, the counter register 304 is part of the system 300. The counter register 304 can also be a part of the vector processor having the system 300. The counter register 304 can be configured to store a count 310. The count 310 can be addable to an effective address for accessing the OVR or the count can be used by the vector processor for iterating on the plurality of address components stored in the VIR 302.

As shown, the 2:1 multiplexor 306 is part of the system 300. The 2:1 multiplexor 306 can also be a part of the vector processor having the system 300. The 2:1 multiplexor 306 can be configured to receive, as inputs, the count 310 from the counter register 304 and an output 312 from the VIR 302. The output 312 from the VIR 302 can include one of the plurality of address components of the VIR corresponding to the count 310. The 2:1 multiplexor 306 can also be configured to receive, as a selection input, a mode value 314. The mode value 314 can be or include a value for selection of the count 310 or a value for selection of the output 312 from the VIR 302. The 2:1 multiplexor 306 can also be configured to select either the count 310 or the output 312 from the VIR 302 according to the received mode value 314. The 2:1 multiplexor 306 can also be configured to output and communicate, via a bus (such as one of the buses of FIG. 1 or 2), a selection output 316 that is one of the selected count or the selected output from the VIR. The selection output 316 can be communicated to a requester accessing the OVR for the ALU. The requester can be a vector load-store unit of the vector processor (e.g., see vector load-store unit 210 shown in FIG. 2), or a vector load-store unit of another vector processor.

When the requester is a vector load-store unit it can be configured to generate effective addresses of load and store operations of the vector processor. The vector load-store unit can also be configured to, for each address component of the VIR, add the address component of the VIR to an effective address for accessing a corresponding position in the OVR.

FIG. 4 illustrates an example system 400 including vector index registers 402a, 402b, and 402c, in accordance with some embodiments of the present disclosure.

The system 400 can be a part of vector processor 102 (e.g., see FIG. 1 or 2) or multiple vector processors. System 400 includes multiple vector index registers including the vector index registers 402a, 402b, and 402c (VIRs 402a, 402b, and 402c). The system 400 also includes a counter register 404, a N:1 multiplexor 406, and a select register 408 connected to the multiplexor. The VIRs 402a, 402b, and 402c can be vector registers of the vector registers 202 shown in FIG. 2. The counter register 404 and the select register 408 can be registers of the scalar registers 204. The N:1 multiplexor 406 can be a part of the bus 206 shown in FIG. 2 or the bus 104 shown in FIG. 1. The N:1 multiplexor 406 is a multiplexor that can receive at least four inputs as shown. But, in some embodiments, the multiplexor 406 can receive much more than four inputs. The N:1 multiplexor 406 outputs one output which can be an address component used for accessing an operand vector register (OVR).

The system 400 can be part of a vector processor that includes an ALU ALUs. The vector processor can also include an OVR of OVRs. The OVR can be configured to store elements of an operand vector to be used as input for a vector operation of the ALU.

The VIRs 402a, 402b, and 402c each can be configured to store a plurality of address components corresponding to a plurality of positions in the OVR or three separate OVRs, for example. In an example with multiple OVRs there can be a separate multiplexor for each OVR. Also, in an example with multiple OVRs there can be a separate addressing system, such as system 300, for each OVR. Each address component of the multiple VIRs (e.g., VIRs 402a, 402b, and 402c) can be addable to an effective address for accessing a corresponding position in the OVR or multiple OVRs. Each position of the OVR(s) can include an element of the operand vector to be operated upon by the ALU.

As shown, the counter register 404 is part of the system 400. The counter register 404 can also be a part of the vector processor having the system 400. The counter register 404 can be configured to store a count 410. The count 410 can be addable to an effective address for accessing one or more OVRs or the count can be used by the vector processor for iterating on the plurality of address components stored in multiple VIRs (e.g., VIRs 402a, 402b, and 402c).

As shown, the N:1 multiplexor 406 is part of the system 400. The N:1 multiplexor 406 can also be a part of the vector processor having the system 400. The N:1 multiplexor 406 can be configured to receive, as inputs, the count 410 from the counter register 404 and outputs (e.g., outputs 412a, 412b, and 412c) from multiple VIRs (e.g., VIRs 402a, 402b, and 402c). Outputs 412a, 412b, and 412c from the VIRs 402a, 402b, and 402c each can include one of the plurality of address components of the respective VIR corresponding to the count 410. The N:1 multiplexor 406 can also be configured to receive, as a selection input, a mode value 414. The mode value 414 can be or include a value for selection of the count 410 or a value for selection of the outputs 412a, 412b, and 412c from the VIRs 402a, 402b, and 402c, for example. The N:1 multiplexor 406 can also be configured to select either the count 410 or the outputs 412a, 412b, and 412c from the VIRs 402a, 402b, and 402c according to the received mode value 414. The N:1 multiplexor 406 can also be configured to output and communicate, via a bus (such as one of the buses of FIG. 1 or 2), a selection output 416 that is one of the selected count or the selected output from the VIRs. The selection output 416 can be communicated to a requester accessing the OVR or multiple OVRs for the ALU or multiple ALUs. The requester can be a vector load-store unit of the vector processor (e.g., see vector load-store unit 210 shown in FIG. 2), or a vector load-store unit of another vector processor. When the requester is a vector load-store unit it can be configured to generate effective addresses of load and store operations of the vector processor. The vector load-store unit can also be configured to, for each address component of the VIRs, add the address component to an effective address for accessing a corresponding position in the OVR(s).

In some embodiments, a vector processor having multiple VIRs can include a counter configured to store a count and the count is addable to an effective address for accessing the OVR or wherein the count is for iterating on each respective plurality of address components stored in the VIRs. In such examples, the processor can also include a N:1 multiplexor configured to receive, as inputs, the count from the counter and respective outputs from the VIRs. Each output from a given VIR of the VIRs can include one of a plurality of address components of the given VIR corresponding to the count. The multiplexor can also be configured to receive, as a selection input, a mode value. The mode value can be a value for selection of the count or a value for selection of one of the respective outputs from the VIRs. The multiplexor can also be configured to select either the count or one of the respective outputs from the VIRs according to the received mode value. The multiplexor can also be configured to communicate the selected count or selected one of the respective outputs from the VIRs to a requester (e.g., such as vector load-store unit of the vector processor) accessing the OVR for the ALU.

FIG. 5 illustrates an example system 500 including a vector index register 502, in accordance with some embodiments of the present disclosure.

The system 500 can be a part of vector processor 102 (e.g., see FIG. 1 or 2) or multiple vector processors. System 500 includes the vector index register 502 (VIR 502), a counter register 504, a 3:1 multiplexor 506, and a select register 508 connected to the multiplexor. System 500 also includes the vector first register 503 connected to the multiplexor 506. The VIR 502 can be one of the vector registers 502 shown in FIG. 2. The counter register 504, the select register 508, and the vector first register 503 (VFR 503) can be registers of the scalar registers 204. The 3:1 multiplexor 506 can be a part of the bus 206 shown in FIG. 2 or the bus 104 shown in FIG. 1.

The system 500 can be part of a vector processor that includes an arithmetic logic unit (ALU) of a plurality of arithmetic logic units (ALUs). The vector processor can also include an operand vector register (OVR) of a plurality of operand vector registers. The OVR can be configured to store elements of an operand vector to be used as input for a vector operation of the ALU. The VIR 502 can be configured to store a plurality of address components corresponding to a plurality of positions in the OVR. Each address component can be addable to an effective address for accessing a corresponding position in the OVR. Each position of the OVR can include an element of the operand vector to be operated upon by the ALU.

The VFR 503 can be configured to store a single address component 511. The single address component 511 is an address component that directs initial access of the OVR at an initial position of the OVR based on the single address component 511 such that the initial position accessed is not the first position of the OVR. For example, if the VFR 503 stores the scalar "3", then a fourth position of the OVR is initially accessed during a vector operation of the OVR. This is instead of starting access of the OVR at the first position of the OVR (e.g., OVR(0)).

As shown, the counter register 504 is part of the system 500. The counter register 504 can also be a part of the vector processor having the system 500. The counter register 504 can be configured to store a count 510. The count 510 can be addable to an effective address for accessing the OVR or the count can be used by the vector processor for iterating on the plurality of address components stored in the VIR 502. Also, the count 510 can be used by the vector processor for incrementing the single address component 511 of the VFR 503 or as shown, it can be added to the single address component 511 and the summation of the count 510 and the single address component 511 is vector first address component 513.

As shown, the 3:1 multiplexor 506 is part of the system 500. The 3:1 multiplexor 506 can also be a part of the vector processor having the system 500. The 3:1 multiplexor 506 can be configured to receive, as inputs, the count 510 from the counter register 504 and an output 512 from the VIR 502 as well as the vector first address component 513 of the summation of the output of the VFR 503 and the counter 504. The output 512 from the VIR 502 can include one of the plurality of address components of the VIR corresponding to the count 510. The 3:1 multiplexor 506 can also be configured to receive, as a selection input, a mode value 514. The mode value 514 can be or include a value for selection of the count 510 or a value for selection of the output 512 from the VIR 502 or a value for selection of the vector first address component 513 of the summation of the output of the VFR 503 and the counter 504. The 3:1 multiplexor 506 can also be configured to select either the count 510 or the output 512 from the VIR 502 or the vector first address component 513 according to the received mode value 514. The 3:1 multiplexor 506 can also be configured to output and communicate, via a bus (such as one of the buses of FIG. 1 or 2), a selection output 516 that is one of the selected count or the selected output from the VIR or the vector first address component 513. The selection output 516 can be communicated to a requester accessing the OVR for the ALU. The requester can be a vector load-store unit of the vector processor (e.g., see vector load-store unit 210 shown in FIG. 2), or a vector load-store unit of another vector processor. When the requester is a vector load-store unit it can be configured to generate effective addresses of load and store operations of the vector processor. The vector load-store unit can also be configured to, for each address component of the VIR, add the address component of the VIR to an effective address for accessing a corresponding position in the OVR.

In some embodiments, a vector processor having at least one VIR can also include at least one VFR as well as at least one respective counter connected to the VIR and the VFR. The counter can be configured to store a count. The count can be addable to an effective address for accessing the OVR. The count can be for incrementing the vector first address component, or the count is for iterating on the plurality of address components stored in the VIR. The vector processor can also include a 3:1 multiplexor configured to receive, as inputs, the count from the counter, an output from the VFR, and an output from the VIR. The output from the VIR can include one of the plurality of address components of the VIR corresponding to the count, and the vector first address component can correspond to the count too. The multiplexor can be configured to receive, as a selection input, a mode value. The mode value can be a value for selection of the count, a value for selection of the output from the VFR, or a value for selection of the output from the VIR. The multiplexor can be configured to select either the count, the output from the VFR, or the output from the VIR according to the received mode value, and to communicate the selected count, the selected output from the VFR, or the selected output from the VIR to a requester (e.g., such as vector load-store unit of the vector processor) accessing the OVR for the ALU.

Not shown in FIGS. 3-5, the systems can include respective vector length registers for each VIR of the VIRs. Each respective vector length register can be configured to store a length of a vector stored in a corresponding VIR. For example, the system 300 can include a vector length register (VLR) configured to store a length of a vector stored in the VIR. The VLRs can be useful in some operations leveraging the use of VIRs for address generation in vector operations.

In some embodiments, the result of the summation of the output of a counter and the output of an alternative address candidate can be multiplexed with the output of a VIR and/or the counter (e.g., see the vector first address component 513 in FIG. 5, which is the summation of the output of the counter 504 and the single address component 511 stored in the VFR 503). Alternatively, the alternative address candidate (e.g., the address component stored in VFR 503) can be used to set the initial value of a counter. The counter set by the alternative address candidate, in the alternative embodiment, is a separate counter from a counter driving a VIR.

In some embodiments, a vector processor having one of the systems 300, 400, or 500 can further include a vector load-store unit configured to generate effective addresses of load and store operations of the vector processor. The vector load-store unit can also be configured to, for each address component of a VIR, add the address component of the VIR to an effective address for accessing a corresponding position in an OVR. The effective address and the values in the VLR can be used by some vector operations to enhance the performance of the operations.

In some embodiments, a vector load-store unit connected to one of the systems 300, 400, or 500 is configured to load an operand vector stored in the OVR as well as load a scalar stored in a scalar register. Such a vector load-store unit can also be configured to compare elements of the loaded operand vector with the loaded scalar as well as store, in the VIR, positions of the elements of the loaded operand vector according to the comparison. For example, the vector load-store unit can also be configured to store position of the elements that match a scalar, store position of the elements that are greater than the scalar, or store position of the elements that are greater than or equal to the scalar. Also, for example, vector load-store unit can be configured to store the positions of the elements that are even, and not store those that are odd, or vice versa.

The vector load-store unit connected to one of the systems 300, 400, or 500 can also be configured to load, from the VIR, the stored positions of the elements of the loaded operand vector. And, the vector load-store unit can be configured to iterate a vector operation over the elements of the loaded operand vector according to the loaded positions stored in the VIR.

In some embodiments, the vector operation is a compress operation configured to store the elements of the loaded operand vector into an output OVR that correspond to the loaded positions stored in the VIR.

In some embodiments, the vector load-store unit can be configured to load the stored elements from the output OVR, and then iterate a second vector operation over the stored elements from the output OVR according to the loaded positions stored in the VIR. The second vector operation can be an expand operation configured to store the elements from the output OVR into a second output OVR at positions of the second output OVR according to the loaded positions stored in the VIR. The expand operation can also be further configured to store a scalar into the second output OVR at other positions of the second output OVR.

In some embodiments, the vector load-store unit can be configured to iterate a second compress operation over elements of a second loaded operand vector according to loaded positions stored in a second VIR. In such embodiments, the vector load-store unit can be configured to store the elements of the second loaded operand vector into a second output OVR that correspond to the loaded positions stored in the second VIR. And, the vector load-store unit can be configured to perform one or more vector operations using the elements from the first output OVR and the second output OVR.

In some embodiments, vector load-store unit can be configured to perform one or more vector operations using the elements from the first output OVR and/or the second output OVR and elements of a third operand vector stored in a third OVR that is sequentially accessed and was not generated by indexing of a VIR. The results of the operation(s) can be stored in a fourth OVR sequentially.

As mentioned the systems 300, 400, and 500 can be a part of one or more vector processors. The systems 300, 400, and 500 can also be sub-systems of a greater system of one or more vector processors.

For example, the systems 300, 400, and 500 can be included in another system or connected to another system of one or more vector processors. Such a system may also not be a part of a vector processor.

Disclosed herein is also a system that can include an ALU of a plurality of ALUs. The system can also include an OVR of a plurality of operand vector registers (OVRs). The OVR can be configured to store elements of an operand vector to be used as input for a vector operation of the ALU. The system can also include a VIR of a plurality of vector index registers (VIRs). The VIR can be configured to store a plurality of address components corresponding to a plurality of positions in the OVR. Each address component can be addable to an effective address for accessing a corresponding position in the OVR. And, each position of the OVR can include an element of the operand vector to be operated upon by the ALU.

The system can also include a counter (or a counter register). The counter can be configured to store a count. The count is at least addable to an effective address for accessing the OVR or for iterating on the plurality of address components stored in the VIR.

The system can also include a N:1 multiplexor. In other words, the system, can include a multiplexor with multiple inputs and one output. The N:1 multiplexor can be configured to receive, as inputs, at least the count from the counter and an output from the VIR. The output from the VIR can include one of the plurality of address components of the VIR corresponding to the count. The N:1 multiplexor can also be configured to receive, as a selection input, a mode value, the mode value being at least a value for selection of the count or a value for selection of the output from the VIR. The N:1 multiplexor can also be configured to select at least either the count or the output from the VIR according to the received mode value. The N:1 multiplexor can also be configured to output and communicate the selection to a vector load-store unit accessing the OVR for the ALU.

In some embodiments, the count can also be for incrementing an address component of a scalar index register for accessing the OVR. In such examples, the N:1 multiplexor can be further configured to receive, as inputs, at least the count from the counter, an output from the VIR, and an output from the scalar index register. The N:1 multiplexor can also be further configured to receive, as a selection input, a mode value, the mode value being at least a value for selection of the count, a value for selection of the output from the VIR, or a value for selection of the output from the scalar index register. The N:1 multiplexor can also be further configured to select at least either the count, the output from the VIR, or the output from the scalar index register, according to the received mode value.

In some embodiments, the scalar index register can be a vector first register (VFR). The VFR can be configured to store a vector first address component. The vector first address component can be an address component that directs initial access of the OVR at an initial position of the OVR based on the vector first address component such that the initial position accessed is not the first position of the OVR. The VFR can be used to access an OVR initially at any position of the OVR based on the value stored in the VFR.

In some embodiments, the count can also be for iterating on a plurality of address components stored in a second VIR of the VIRs. In such examples, the N:1 multiplexor can be configured to receive, as inputs, at least the count from the counter, an output from the VIR, and an output from the second VIR. Also, the N:1 multiplexor can be configured to receive, as a selection input, a mode value, the mode value being at least a value for selection of the count, a value for selection of the output from the VIR, or a value for selection of the output from the second VIR. And, the N:1 multiplexor can be configured to select at least either the count, the output from the VIR, or the output from the second VIR, according to the received mode value.

FIGS. 6-10 illustrate example operations, in accordance with some embodiments of the present disclosure. In some embodiments, a vector load-store unit, such as vector load-store unit 210, can perform or facilitate, solely or in combination with other parts of the vector processor, many or all of the operations illustrated in FIGS. 6-10. In some embodiments, storing, loading, determinations, incrementations, and changes to values describe herein can be performed by a vector load-store unit of the vector processor according to instructions stored in the vector load-store unit. In some other embodiments, other parts of the vector processor can perform or facilitate the operations illustrated in FIGS. 6-10 as well as other operations described herein.

In general, the systems described herein can implement many functions including vector compress and expand functions. For example, in a list of address components stored in a VIR, such as VMX, the elements of a given vector A can be compressed into a new vector by reading the elements A(VMX(i)) out of the vector A and store into the output vector B(i). Thus, vector A is compressed into B by B(i)=A (VMX(i)), for i=0, 1, . . . n. Similarly, the expand can be done in reverse (e.g., B(VMX(i))=A(i)). Further, one or more VIRs can allow the vector processor to perform sparse operations directly, with or without compress and/or expand. For example, a VIR can implement indexing in B(i)=function (A(VMX(i)), C(VMX(i)), which can be a sparse operation with compress. Also, a VIR can implement indexing in B(VMX(i))=function (A(VMX(i)), C(VMX(i)), which can be a sparse operation without compress. Also, a VIR can implement indexing in B(VMX(i))=function (A(i), C(i)), which can be an operation on compressed vectors with expand.

FIG. 6 illustrates example operations of method 600 for accessing elements of an operand vector for one or more vector operations, in accordance with some embodiments of the present disclosure.

In FIG. 6, the method 600 begins at step 602, with storing, in an operand vector register (OVR) of a plurality of operand vector registers (OVRs) in a vector processor, elements of an operand vector to be used as input for a vector operation of an arithmetic logic unit (ALU) of a plurality of arithmetic logic units (ALUs) in the vector processor. The storing of the elements of the operand vector in the OVR can occur any time before it is used as input for the vector operation of the ALU. For example, the step 602 can occur after step 618.

At step 604, the method 600 continues with storing, in a vector index register (VIR) of a plurality of vector index registers (VIRs) in the vector processor, a plurality of address components corresponding to a plurality of positions in the OVR.

At step 606, the method 600 continues with iterating on the plurality of address components stored in the VIR according to a count (such as a count stored in a counter register), to provide an output. Subsequently the vector load-store unit adds an output from the VIR to the effective address for accessing the OVR. The output from the VIR can include one of the plurality of address components of the VIR corresponding to the count. A single iteration over the plurality of address components stored in the VIR according to the count can occur each time the vector load-store unit requests an output from the VIR for adding the output of the VIR to the effective address for accessing the OVR. This can occur repeatedly until the VIR has been iterated through for an operation on the OVR.

At step 608, the method 600 continues with receiving, by a N:1 multiplexor of the vector processor, at least the count from the counter and an output from the VIR, wherein the output from the VIR can include one of the plurality of address components of the VIR corresponding to the count.

At step 610, the method 600 continues with receiving, by the N:1 multiplexor, a selection input including a mode value, the mode value being at least a value for selection of the count or a value for selection of the output from the VIR.

At step 612, the method 600 continues with selecting, by the N:1 multiplexor, at least either the count or the output from the VIR according to the received mode value.

At step 614, communicating the selection to a vector load-store unit of the vector processor accessing the OVR for the ALU.

At step 616, the method 600 continues with adding a count stored in a counter to an effective address for accessing the OVR.

At step 618, the method 600 continues with adding an address component of the VIR to an effective address for accessing a corresponding position in the OVR. Each position of the OVR can include an element of the operand vector to be operated upon by the ALU.

At step 620, the method 600 continues with accessing the OVR for the ALU, by the vector load-store unit, according to the effective address generated at step 616 or 618.

Figure 7:
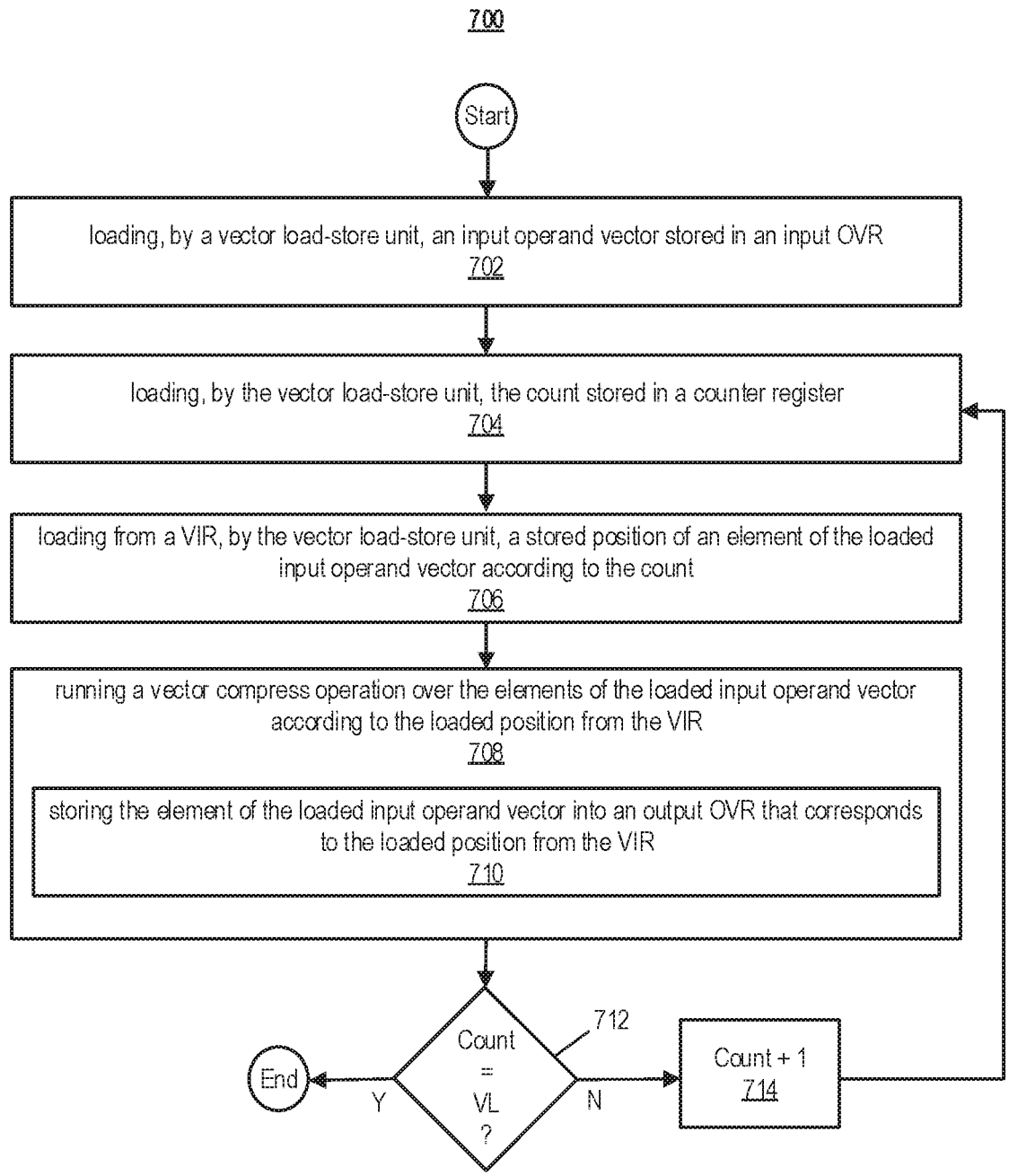
FIG. 7 illustrates example operations of method 700 for compressing elements of an operand vector, in accordance with some embodiments of the present disclosure.

FIG. 7 illustrates example operations of method 700 for compressing elements of an operand vector, in accordance with some embodiments of the present disclosure. In FIG. 7, the method 700 begins at step 702, with loading, by a vector load-store unit, an input operand vector stored in an input OVR.

At step 704, the method 700 continues with loading, by the vector load-store unit, the count stored in a counter register.

At step 706, the method 700 continues with loading from a VIR, by the vector load-store unit, a stored position of an element of the loaded input operand vector according to the count.

At step 708, the method 700 continues with running a vector compress operation over the elements of the loaded input operand vector according to the loaded position from the VIR. Step 708 includes step 710 that includes the method 700 continuing with storing the element of the loaded input operand vector into an output OVR that corresponds to the loaded position from the VIR.

At step 712, the method 700 continues with comparing the count to a value representing the vector length of the VIR (i.e., VL) such that the vector compress operation can be iterated over the input OVR for each of the positions stored in the VIR. When the count equals the vector length of the VIR, then the method 700 ends. When the count is less than the vector length of the VIR, then the method 700 continues with incrementing the count at 714 and then returning to step 704 (loading the count stored in a counter register) which is followed by steps 706 (loading from a VIR, by the vector load-store unit, a stored position of an element of the loaded input operand vector according to the count) and 708 (running the vector compress operation over the elements of the loaded input operand vector according to the loaded position from the VIR). This way the vector compress operation is iterated over the input OVR for each of the positions stored in the VIR.

Figure 8:
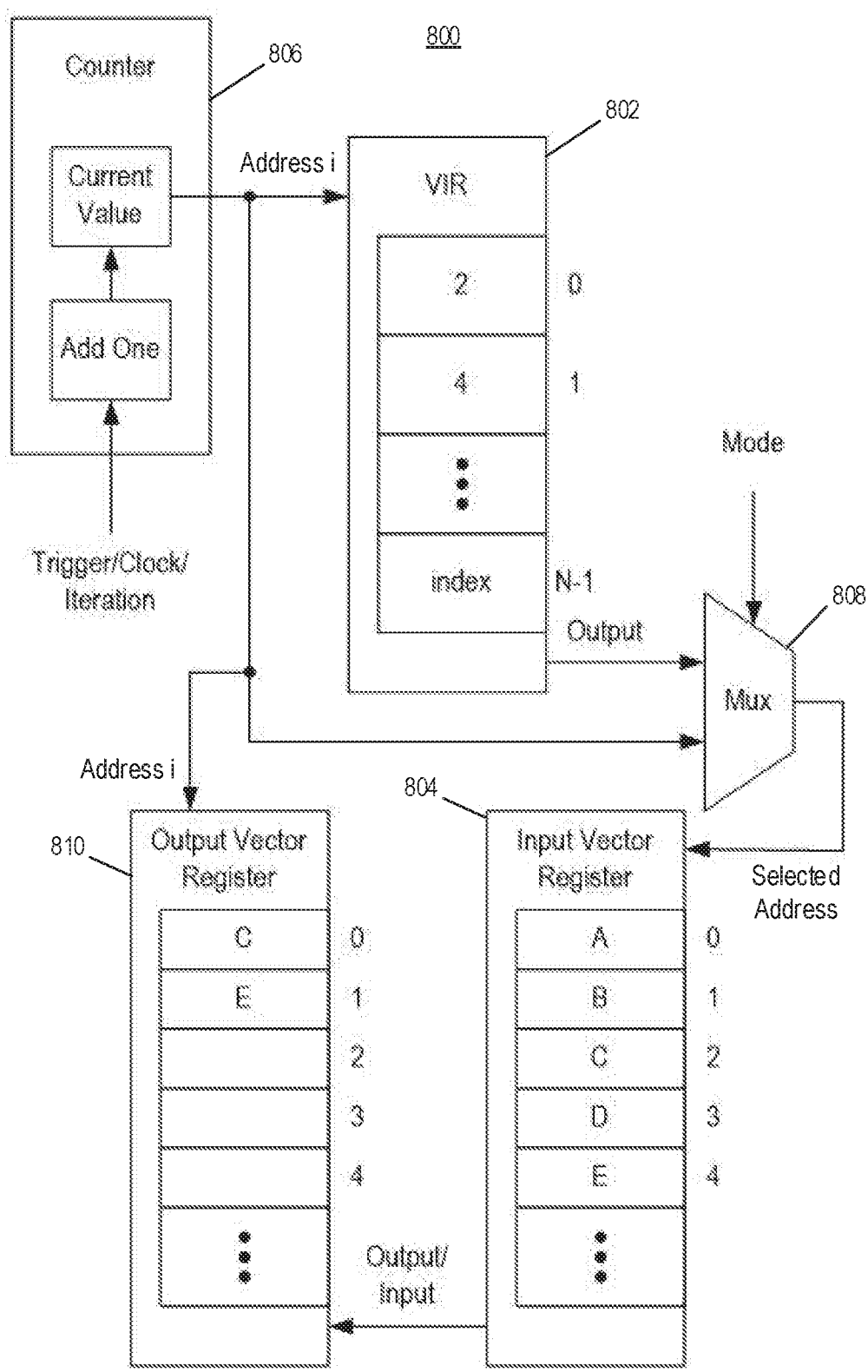
FIG. 8 illustrates an example system 800 including a vector index register 802 being used for compressing elements of an input operand vector stored in an input OVR 804, in accordance with some embodiments of the present disclosure.

FIG. 8 illustrates an example system 800 including a vector index register 802 (VIR 802) being used for compressing elements of an input operand vector stored in an input OVR 804, in accordance with some embodiments of the present disclosure. Example system 800 is one example of a system that can implement at least method 700.

In FIG. 8, the VIR 802 stores a list of positions of the input OVR 804 (e.g., "2" as the input OVR's first element, and "4" as the input OVR's second element"). In this illustrated example, it is shown that the vector processor runs for two cycles or iterations of a vector compress operation. At the first iteration, counter 806 outputs the count of "0" which is the value stored in the counter at the first cycle. In the first cycle, VIR 802 is shown outputting "2". The multiplexor 808 selects between the address component ("0") as specified by the counter 806 in a normal mode operation or the address component ("2") as specified by the VIR 802 in a VIR mode of operation (or a compress mode of operation in this specific example). When the VIR (or compress mode) is selected by the multiplexor 808 in the first cycle the output of "2" from the VIR 802 is the address component used for accessing the input OVR 804. As a result, the input OVR 804 is accessed for an output of element "C" at position "2" of the input OVR. The output OVR 810 is addressed directly though the count stored in the counter 806. Since the count of the counter 806 is "0" in the first cycle, the output ORV 810 stores "C" as its first element. In the next iteration or cycle, the output ORV 810 stores "E" as a second element at position "1" of the output OVR. In this example with two cycles show, the input OVR 804 having elements of {A, B, C, D, E} is compressed into the output OVR 810 having elements of {C, E}.

Figure 9:
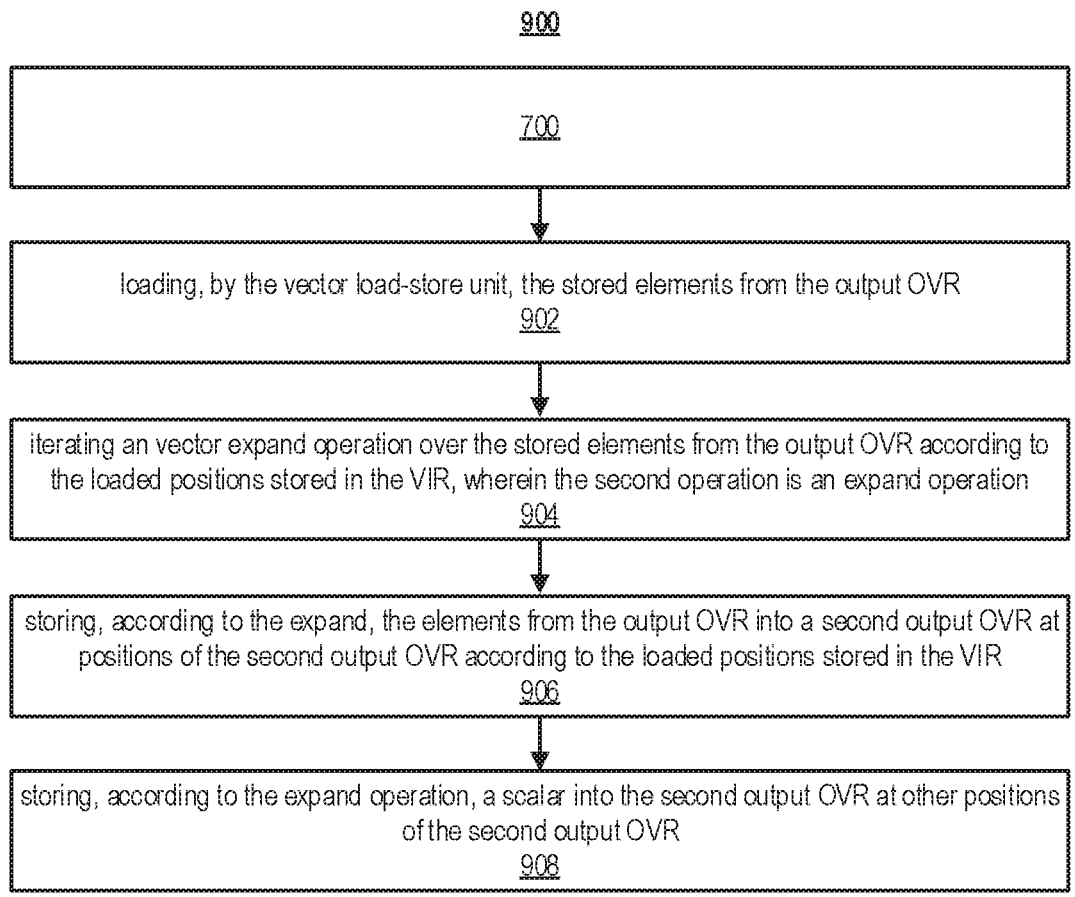
FIG. 9 illustrates example operations of method 900 for expanding elements of an operand vector, such as elements of a compressed operand vector, in accordance with some embodiments of the present disclosure.

Also, in reference to FIG. 8, if the address signals for the input/output vectors are reversed, {C, E} can be expanded into a second output OVR having element of {x, x, C, x, E} where x is the existing values before the compress operation or a scalar value selected from a scalar register (e.g., see FIG. 9 which is an example method expanding a compressed vector with a scalar value from a scalar register).

Further, if a value from a VFR is added to the count of the counter, the summation can be used so that the first iteration of an operation on the input OVR occurs at another position of the input OVR instead of the first position of the input OVR (e.g., the first position of input OVR 804 is labeled "0"). E.g., see FIG. 5. Alternatively, the VFR can be used to provide an input for the count register so that the initial value of the count register at the beginning of a vector operation is the value stored in the VFR. Such options allow for vector first processing.

FIG. 9 illustrates example operations of method 900 for expanding elements of an operand vector, such as elements of a compressed operand vector, in accordance with some embodiments of the present disclosure.

As shown in FIG. 9, the method 900 can begin with method 700, which concludes with an output of a compressed operand vector stored in the output OVR. Next, the method 900 continues at step 902, with loading, by the vector load-store unit, the stored elements from the output OVR. The stored elements being elements of a compressed vector.

At step 904, the method 900 continues with iterating a second vector operation over the stored elements from the output OVR according to the loaded positions stored in the VIR. The second operation is a vector expand operation. In other words, the second vector operation, being a vector expand operation, expands the compressed vector stored in the output OVR.

At step 906, the method 900 continues with storing, according to the expand operation, the elements from the output OVR into a second output OVR at positions of the second output OVR according to the loaded positions stored in the VIR.

At step 908, the method 900 continues with storing, according to the expand operation, a scalar into the second output OVR at other positions of the second output OVR. The final output of the expand operation after step 908 is an expanded vector with the elements from the compressed vector and one or more instances of the scalar value at other positions of the expanded vector. The positioning of the elements from the compressed vector in the expanded vector correspond to the loaded positions or address components stored in the VIR.

Figure 10:
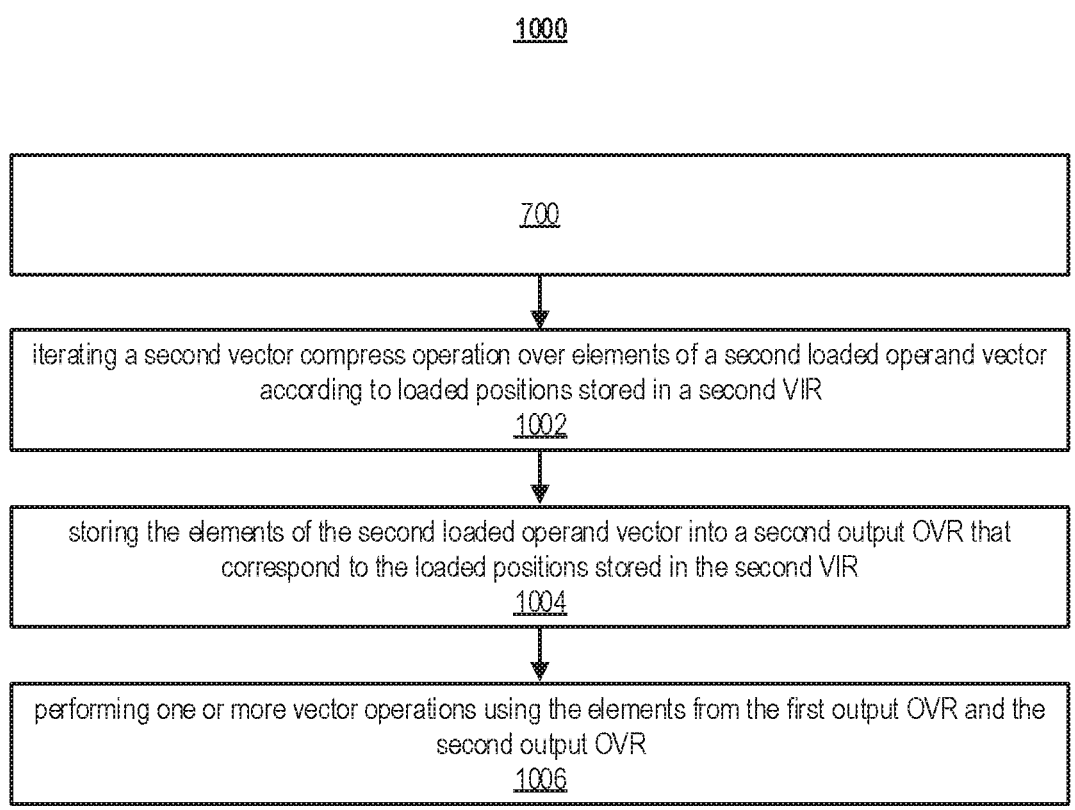
FIG. 10 illustrates example operations of method 1000 related to operations on multiple compressed vectors, in accordance with some embodiments of the present disclosure.

FIG. 10 illustrates example operations of method 1000 related to operations on multiple compressed vectors, in accordance with some embodiments of the present disclosure.

As shown in FIG. 10, the method 1000 can begin with method 700, which concludes with an output of a compressed operand vector stored in the output OVR. Also, analogous operations to method 700 are performed on a second operand vector. For example, at step 1002, the method 1000 continues with iterating a second compress operation over elements of a second loaded operand vector according to loaded positions stored in a second VIR.

At step 1004, the method 1000 continues with storing the elements of the second loaded operand vector into a second output OVR that correspond to the loaded positions stored in the second VIR.

At step 1006, the method 1000 continues with performing one or more vector operations using the elements from the first output OVR and the second output OVR. The one or more vector operations are using the elements from two compressed vectors, which are the elements from first output OVR and the second output OVR.

As mentioned herein, at least some of the embodiments disclosed herein are vector index registers in vector processors that each store multiple addresses for accessing multiple positions in vectors. Further, at least some of the embodiments disclosed herein are vector index registers for TRUE and/or FALSE results of one or more comparisons (such as numerical comparisons) that each store multiple addresses for accessing multiple positions in operand vectors.

Also, as mentioned herein, it is known to use a scalar index register in a vector processor to reference multiple positions of vectors by changing the value stored in the scalar index register during a vector operation. However, by using a vector indexing register (VIR), such as a VIR for TRUE results or a VIR for FALSE results, for indexing multiple positions of one or more operand vectors, the scalar index register can be replaced and at least the continual changing of values in the scalar index register during a vector operation using TRUE and/or FALSE results can be avoided.

As mentioned herein, there are many limitations associated with using a scalar register or single-entry vector for indexing a vector. And, some of these limitations can curb the performance of a vector processor using the scalar index register. By using a vector indexing register, such as a VIR for TRUE results or a VIR for FALSE results, for indexing a plurality of positions of one or more operand vectors used in vector comparison operations or other types of operations, the scalar index register can be replaced and at least the continual changing of the scalar index register during a vector operation can be avoided.

In some embodiments, when a vector of TRUE and FALSE elements is computed (e.g., the contents of vector mask, Vm), a system or circuit can generate an index vector to compliment or replace the vector. The index vector can be for TRUE results or FALSE results or a combination thereof, and these type of index vectors can be stored in respective vector index registers, VIR_TRUE, VIR_FALSE, and VIR_COMBINED. The VIR_COMBINED is a single VIR that includes a TRUE section and a FALSE section.

A VIR_TRUE, VIR_FALSE, and/or VIR_COMBINED can include the elements in a vector mask (Vm) or a corresponding OVR. A Vm is a vector that stores the TRUE and FALSE results of a comparison on a vector (such as a numerical comparison on a vector). The Vm can be used for conditional operations and compress and expand operations. A vector register for the Vm can be replaced by the VIR_TRUE, VIR_FALSE, and/or VIR_COMBINED. And, the VIR_TRUE, VIR_FALSE, and/or VIR_COMBINED can increase the performance of a vector processer in replacing a Vm when the vector processor performs vector operations.

For example, a counter can be used to track the number of TRUE elements in the computing of Vm, starting with zero. When the ith TRUE element is identified as the result of the jth element of Vm, the index j is saved into the ith element of vector VmxT (and store in VIR_TRUE). Similarly, a counter can be used to track the FALSE results and save the indices of the FALSE results in a vector VmxF (and store in VIR_FALSE). The sum of the vector lengths of VmxT and VmxF is equal to the vector length of Vm. The vector processor can use Vi as the vector where ith element has the value 1 to generate VmxT and VmxF, wherein VmxT=compress (Vi, Vm) and VmxF=compress (Vi, ! Vm).

The compressed index or address vector VmxT and/or VmxF stored or loaded in VIR_TRUE or VIR_FALSE, can be used in conditional operations and/or for compress and expand operations (such as the compress and expand operations described herein). With the capability to access a vector with compressed index or address vectors, such operations can run directly on the vectors without having to generate the compressed vector on an intermediate vector register such as a register for iterating through Vm.

As mentioned herein, the uses of a VIR, such as a VIR_TRUE or VIR_FALSE, are many. For example, a VIR_TRUE or a VIR_FALSE can be used to implement a vector compress or expand function more efficiently.

Figure 11:
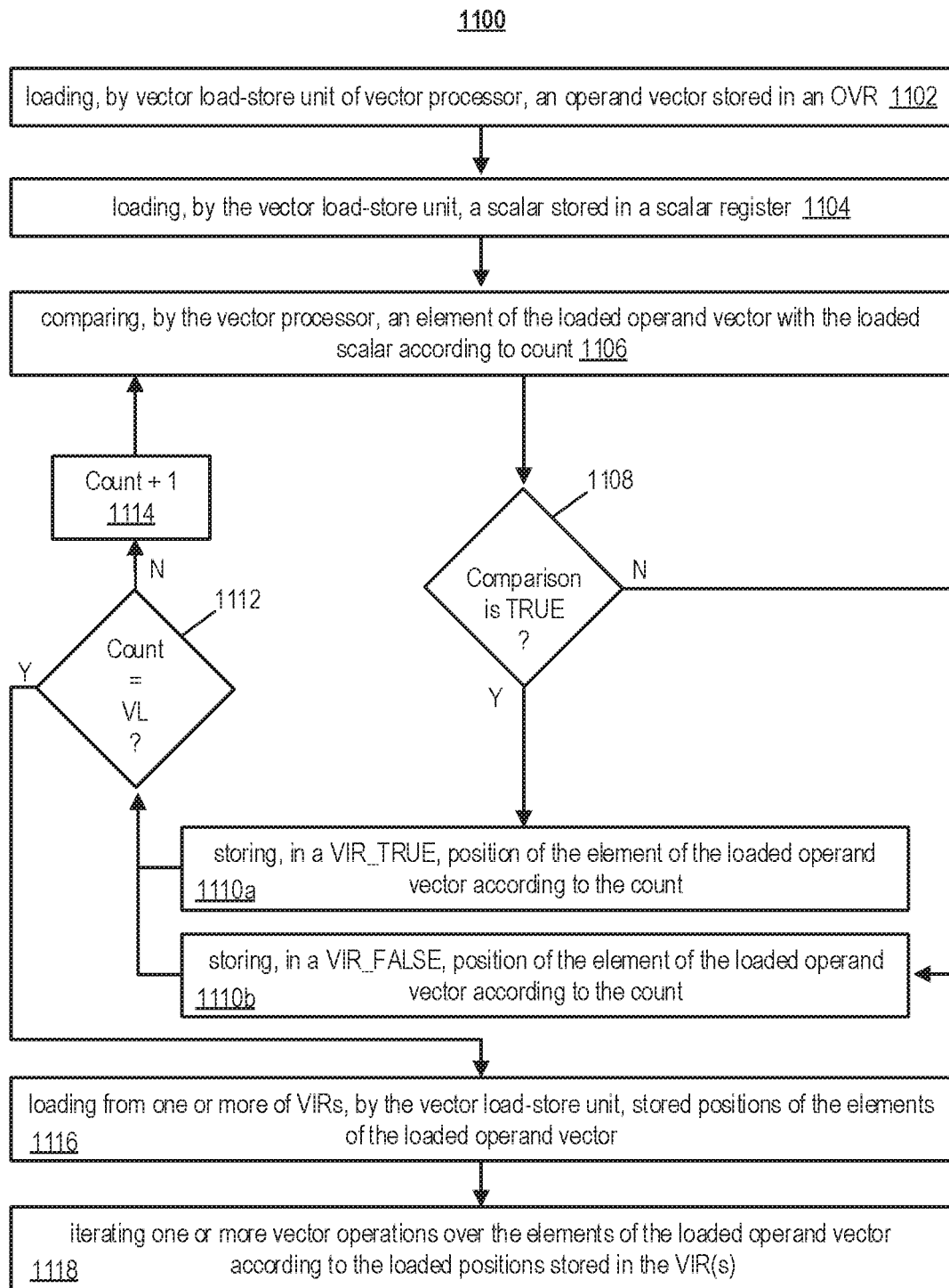
FIG. 11 illustrates example operations of method 1100 for building indexing vectors for storing in vector indexing registers for TRUE and FALSE results (e.g., "0" and "1" results) of a comparison (VIR_TRUE and VIR_FALSE), in accordance with some embodiments of the present disclosure.

FIG. 11 illustrates example operations of method 1100 for building indexing vectors for storing in vector indexing registers for TRUE and FALSE results (e.g., "1" or "0" results) of a comparison (VIR_TRUE and VIR_FALSE), in accordance with some embodiments of the present disclosure.

The method 1100 begins at step 1102 with loading, by a vector load-store unit of a vector processor, an operand vector stored in an operand vector register (OVR).

At step 1104, the method 1100 continues with loading, by the vector load-store unit, a scalar stored in a scalar register of the vector processor.

At step 1106, the method 1100 continues with comparing, by the vector processor, an element of the loaded operand vector with the loaded scalar according to a count stored in a counter. The counter can be another scalar register and a part of the vector processor. Also, in some embodiments, the method 1100 can continue with comparing, by the vector processor, an element of the loaded operand vector with another operand vector according to a count stored in a counter. In some embodiments, for the comparison, the element of the loaded operand vector is accessed by the vector processor according to a first count in a first counter, and the element of the other loaded operand vector is accessed by the vector processor according to a second count in a second counter. The comparison can be a numerical comparison.

At step 1108, the method 1100 continues with identifying whether the result of the comparison of step 1106 is TRUE or FALSE (e.g., "1" or "0"). If the result of the comparison of step 1106 is TRUE, then the method 1100 continues at step 1110a with storing, in a vector index register for TRUE results of the comparison (VIR_TRUE), a position of the element of the loaded operand vector according to the count (such as according to the count via a TRUE count stored in a TRUE counter—e.g., see TRUE counter 1216a depicted in FIG. 12). If the result of the comparison of step 1106 is FALSE, then the method 1100 continues at step 1110b with storing, in a vector index register for FALSE results of the comparison (VIR_FALSE), a position of the element of the loaded operand vector according to the count (such as according to the count via a FALSE count stored in a FALSE counter—e.g., see FALSE counter 1216b depicted in FIG. 12).

At step 1112, the method 1100 continues with identifying whether the count equals the vector length (VL) of the operand vector stored in the OVR. In some embodiments, the method 1100 can continue with identifying whether the VL of the OVR equals the result of adding the VL of the VIR_TRUE and the VL of the VIR_FALSE, which can be another way to identify whether the count equals the VL of the operand vector stored in the OVR. These example alternative ways of identifying whether the count equals the VL of the OVR can show that all the elements of the OVR are compared. If the count is less than the VL, then the method continues at step 1114 with incrementing the count. By incrementing the count until the count equals the VL, the vector processor can continue with storing positions of elements of the loaded operand vector according to the count until the positions of the elements of the loaded operand vector are stored in the VIR_TRUE or the VIR_FALSE. In other words, the method 1100 continues the storing of positions of elements of the loaded operand vector according to the count until the positions of the elements of the loaded operand vector are stored in the VIR_TRUE or the VIR_FALSE.

At step 1112, if the count is equal to the VL, then the method 1100 has completed the building of indexing vectors for storing in VIR_TRUE and VIR_FALSE. The count cannot be greater than the VL because the operation of building the indexing vectors is complete upon the count being equal to the VL. When new indexing vectors are to be built, the count is reset and a VL register storing the scalar value of the VL can be reset as well. The vector processor can initially determine the vector length of an OVR and then store the length in the VL register before performing method 1100.

Upon completion of the building of indexing vectors which are stored in VIR_TRUE and VIR_FALSE, the method 1100 continues, at step 1116, with loading from at least one of the VIR_TRUE, or the VIR_FALSE, or a combination thereof, by the vector load-store unit, stored positions of the elements of the loaded operand vector. And, at step 1118, the method 1100 continues with iterating one or more vector operations over the elements of the loaded operand vector according to the loaded positions.

Figure 12:
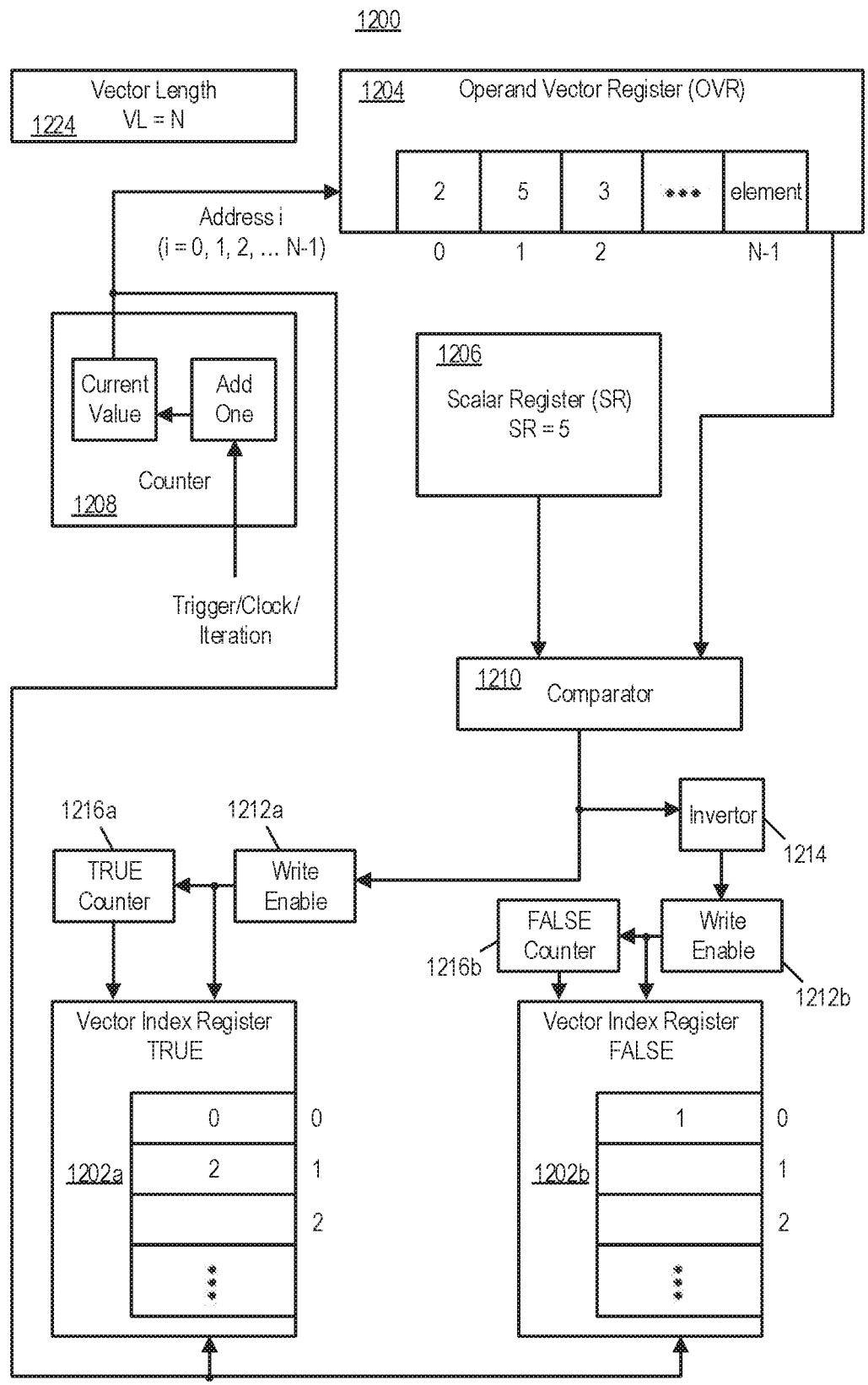
FIG. 12 illustrates an example system 1200 for building indexing vectors for storing in VIR_TRUE 1202a and VIR_FALSE 1202b, in accordance with some embodiments of the present disclosure.

FIG. 12 illustrates an example system 1200 for building indexing vectors for storing in VIR_TRUE 1202a and VIR_FALSE 1202b, in accordance with some embodiments of the present disclosure. The system 1200 can implement many of the operations and aspects of method 1100 and the system 1200 can be a part of one or more vector processors.

The system 1200 includes the VIR_TRUE 1202a and VIR_FALSE 1202b, such as the VIR_TRUE and VIR_FALSE described in the description of method 1100. The system also includes an OVR 1204, such as the OVR described in the description of method 1100.

The system 1200 also includes a scalar register (SR) 1206, such as the scalar register described in the description of method 1100. In some embodiments, the scalar register can be replaced with another OVR addressed in a same way as the OVR 1204.

The system also includes a counter 1208, which can be partially implemented by a counter register and can be the counter described in the description of the method 1100.

The system 1200 also includes a comparator 1210 that can perform a comparison of the value stored in the SR 1206 and a value stored in an element of the OVR 1204. The comparator 1210 can perform comparisons such as OVR(i)<SR, OVR(i)=SR, OVR(i)>SR, OVR(i)≤SR, or OVR(i)≥SR. The comparator 1210 compares two numbers at a time or per cycle. At each iteration i (which also represents address or address component i), the counter 1208 provides address i for accessing the OVR 1204 for the comparison with the scalar value from SR 1206 by the comparator 1210. In short, the output of OVR 1204 at iteration or address i is compared with the value from the scalar register 1206. The comparator 1210 generates a single output, which is either TRUE or FALSE (e.g., "1" or "0").

The comparator 1210 can be configured to perform the comparison at step 1106 of method 1100. In other words, the comparator 1210 can be configured to compare an element of a loaded operand vector with a loaded scalar according to a count stored in a counter register. The comparator 1210 can also be configured to perform the identification of a TRUE or FALSE result at step 1108. In other words, the comparator 1210 can be configured to identify whether the result of the comparison of step 1106 is TRUE or FALSE. The comparator 1210 can be configured to output a TRUE or FALSE result, such as a "1" for a TRUE result or a "0" for a FALSE result. The output of the comparator 1210 is inputted into a respective write enable for each of the VIR_TRUE 1202*a* and the VIR_FALSE 1202*b*.

The output from the comparator 1210 can be communicated directly to the write enable 1212*a* for the VIR_TRUE 1202*a*. The output from the comparator 1210 can be communicated indirectly to the write enable 1212*b* for the VIR_FALSE 1202*b*, via an invertor 1214. The invertor 1214 is configured to invert the output of comparator 1210 before it reaches the write enable 1212*b* for the VIR_FALSE 1202*b*. For example, if the output of the comparator 1210 is TRUE (e.g., "1"), then when it is inputted into the invertor 1214 the invertor inverts the value to FALSE (e.g., "0") and outputs FALSE.

The system 1200 also includes a separate TRUE counter 1216*a* for the VIR_TRUE 1202*a* and a separate FALSE counter 1216*b* for the VIR_FALSE 1202*b*. The output of the comparator 1210 drives the two counters, counters 1216*a* and 1216*b*. The counters 1216*a* and 1216*b* are separate from the counter 1208 that provides the address for the OVR 1204. Output of TRUE counter 1216*a* is used as the address for accessing VIR_TRUE 1202*a*. Output of FALSE counter 1216*b* is used as the address for accessing VIR_FALSE 1202*b*.

For example, when the output of the comparator 1210 is TRUE, the output triggers write enable 1212*a* to write the current position from the OVR 1204 into the VIR_TRUE 1202*a*. When the output of the comparator 1210 is FALSE, the output triggers write enable 1212*b* to write the current position from the OVR 1204 into the VIR_FALSE 1202*b*. This functionality is provided via the circuit including the invertor 1214 and the two write enables 1212*a* and 1212*b*.

The output of counter 1208 is used as the address or address component to be written into VIR_TRUE 1202*a* at an address specified by the TRUE counter 1216*a*. This occurs when the output of the comparator 1210 is TRUE. The value stored in counter TRUE 1216*a* is increased by one for each triggering TRUE output from the comparator 1210. The output of counter 1208 is used as the address or address component to be written into VIR_FALSE 1202*b* at an address specified by the FALSE counter 1216*b*. This occurs when the output of the comparator 1210 is FALSE. The value stored in FALSE counter 1216*b* is increased by one for each triggering FALSE output from the comparator 1210. This overall functionality of selecting where to store the addresses of the OVR components is provided by the circuit including the comparator 1210, the write enables 1212*a* and 1212*b*, the invertor 1214, and the TRUE and FALSE counters 1216*a* and 1216*b*.

The VIR_TRUE 1202*a* and the VIR_FALSE 1202*b* each are an output register of the system 1200. The VIR_TRUE 1202*a* has three inputs. The first input is from write enable 1212*a*. For example, the input of TRUE from this first input allows writing into the VIR_TRUE 1202*a* and FALSE disallows writing into the register. The second input is from the TRUE counter 1216*a*, which is for the address of accessing VIR_TRUE 1202*a*. The third input is from the counter 1208 and this input includes the data written into the VIR_TRUE 1202*a* at the address of the register provided by the TRUE counter 1216*a* (or the second input).

The system 1200 can be a part of a vector processor that includes a vector load-store unit. The vector load-store unit can load data stored in the registers of the system 1200 to main memory as well as store data from main memory to the registers of the system, and vice versa (load data stored in memory to the registers of system 1200 as well as store data from registers of the system to memory).

The system 1200 is also shown to include a scalar register for vector length, vector length register 1224 (VLR 1224). VLR 1224 is configured to store the vector length (VL) of the OVR 1204. A vector processor can load the VL into memory from VLR 1224 to identify whether the count from counter 1208 equals the VL of the operand vector stored in the OVR 1204. This is one way for example to implement step 1112 of method 1100 in FIG. 11. If the count is less than the VL, then the count in the counter 1208 continues to increment per clock cycle or another trigger or iteration (e.g., see step 1114). By incrementing the count until the count equals the VL, the vector processor can continue with storing positions of elements of the OVR 1204 according to the count until the positions of the elements of the OVR are stored in the VIR_TRUE 1202*a* or the VIR_FALSE 1202*b*. In other words, the system 1200 can continue with the storing of positions of elements of the OVR 1204 according to the count until the positions of the elements of the loaded operand vector are stored in the VIR_TRUE 1202*a* or the VIR_FALSE 1202*a*. This is one of the ways that the system 1200 can implement operations of the method 1100.

If the count is equal to the VL, then the vector processor using system 1200 has completed the building of indexing vectors for storing in VIR_TRUE 1202*a* and VIR_FALSE 1202*b*. The count cannot be greater than the VL because the operation of building the indexing vectors is complete upon the count being equal to the VL. When new indexing vectors are to be built, the count is reset in counter 1208 and VL is determined and stored in VLR 1224. The vector processor can initially determine the vector length of an OVR (e.g., the OVR 1204) and then store it in the VLR 1224 before performing method 1100.

Upon completion of the building of indexing vectors which are stored in VIR_TRUE 1202*a* and VIR_FALSE 1202*b*, the vector processor can continue with loading from at least one of the VIR_TRUE, or the VIR_FALSE, or a combination thereof, by a vector load-store unit of the processor, stored positions of the elements of the OVR 1204. And, the vector processor can also continue with iterating one or more vector operations over the elements of the OVR 1204 according to the loaded positions in the VIR_TRUE 1202*a* and/or VIR_FALSE 1202*b*.

Figure 14:
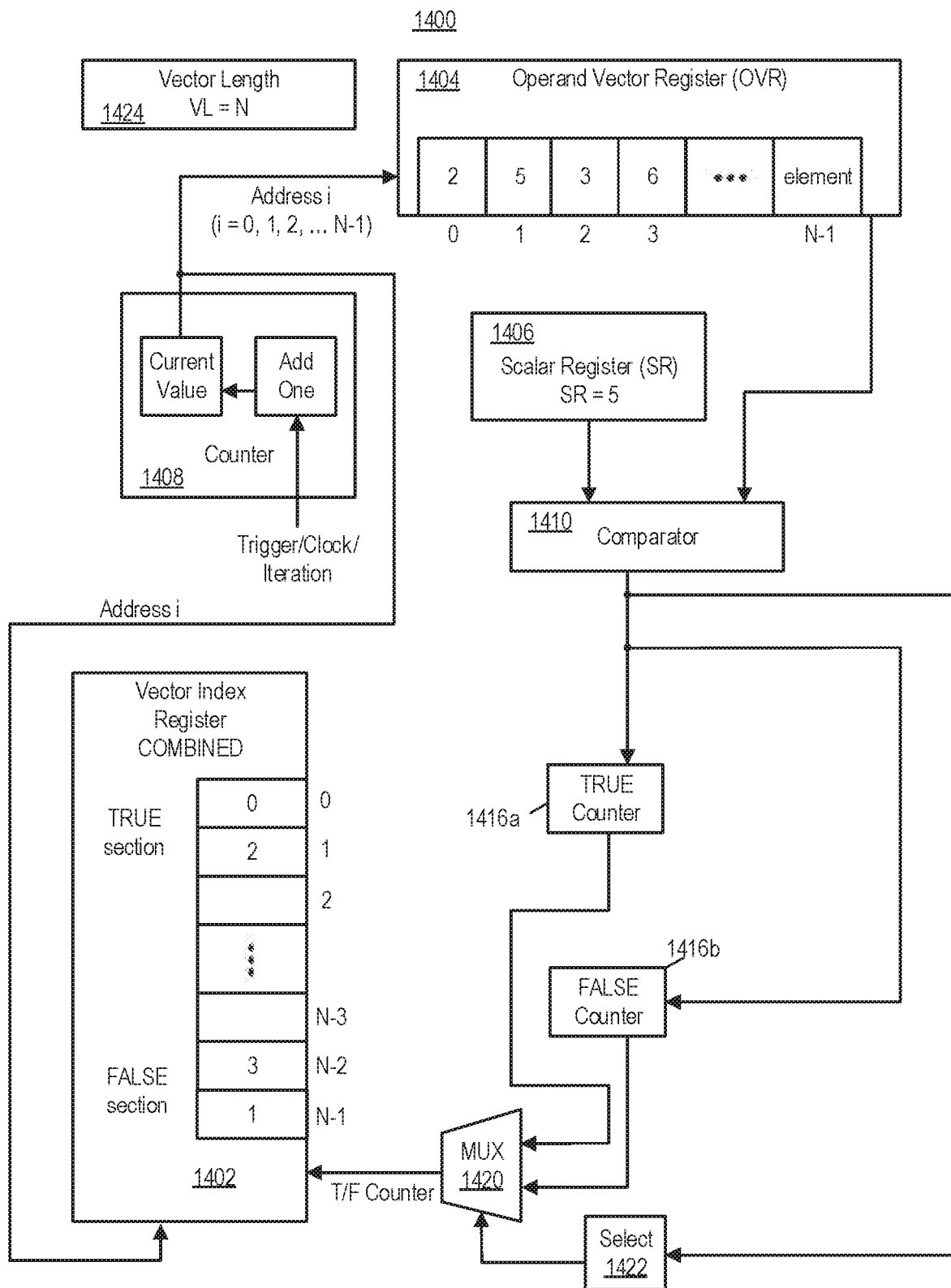
FIG. 14 illustrates an example system 1400 for building a combined indexing vector for storing in VIR_combined 1402, in accordance with some embodiments of the present disclosure.

An alternative to system 1200 is illustrated in FIG. 14 in which both the VIR_TRUE and the VIR_FALSE are essentially combined into one vector index register with the TRUE addresses of the OVR stored from the top down and the FALSE addresses of the OVR stored from the bottom up of the register. In such an alternative, counter for addressing the TRUE portion of the combined VIR starts with address "zero" and adds one for each TRUE input into the combined register. The FALSE counter starts with "N-1" for the address to access the combined VIR and the counter reduces by one for each FALSE input into the combined register. A multiplexor, as shown in FIG. 14 can be used to choose from either the counter for TRUE inputs or the counter for FALSE inputs. With each cycle, the VIR is enabled once for write because the input is either to the TRUE section (e.g., addresses 0, 1, 2, . . . , count+1, wherein count begins with "0"), or the FALSE section of the VIR (e.g., addresses N−1, N−2, N−3, . . . , VIR_length−count+1, wherein count begins with "0"); and thus, the index is generated from either the top down or the bottom up.

Figure 13:
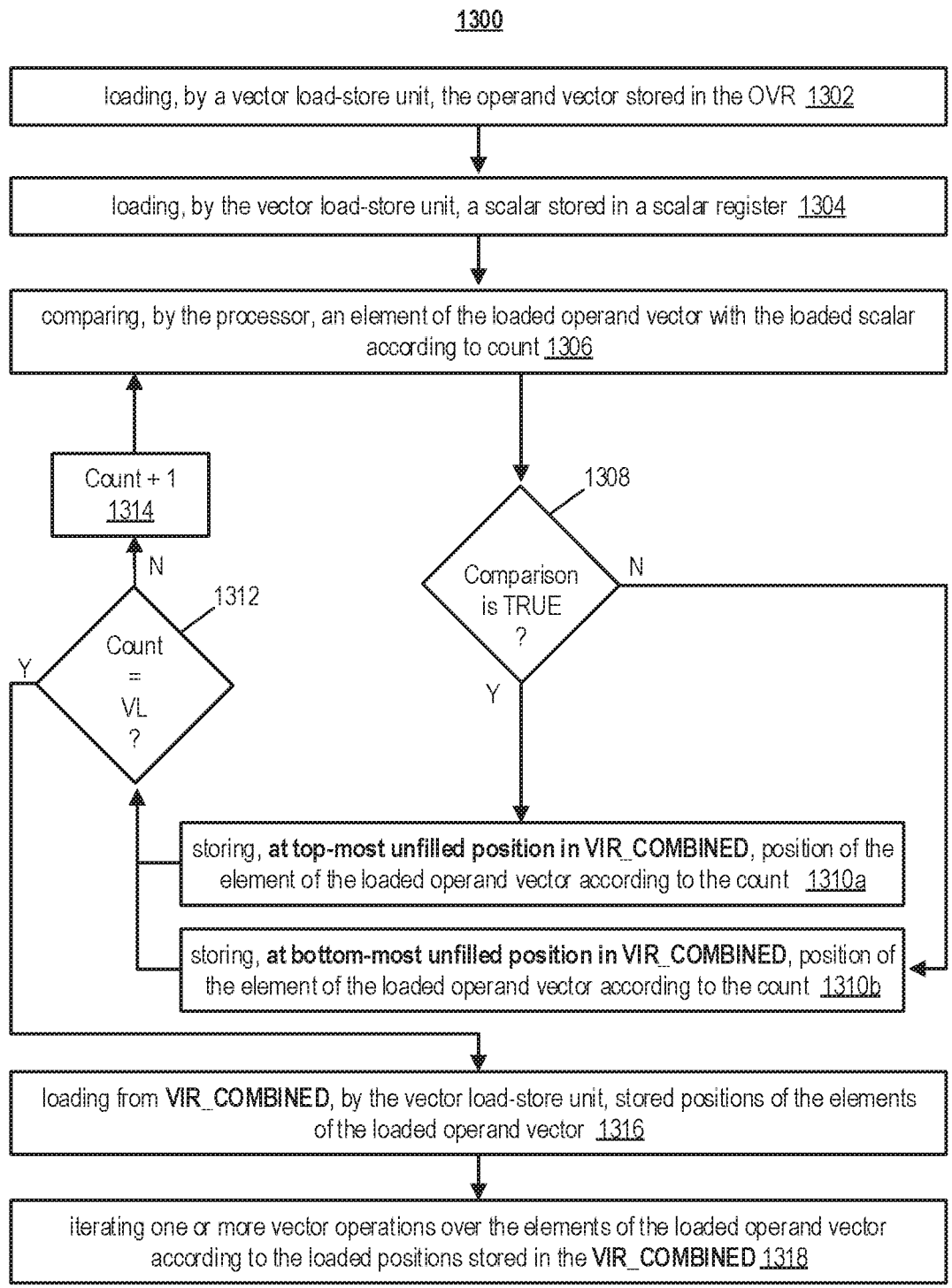
FIG. 13 illustrates example operations of method 1300 for building a combined indexing vector for storing in a combined vector indexing register for TRUE and FALSE results of a comparison (VIR_combined), in accordance with some embodiments of the present disclosure.

FIG. 13 illustrates example operations of method 1300 for building a combined indexing vector for storing in a combined vector indexing register for TRUE and FALSE results (e.g., "1" or "0" results) of a comparison (VIR_combined), in accordance with some embodiments of the present disclosure.

The method 1300 begins at step 1302 with loading, by a vector load-store unit of a vector processor, an operand vector stored in an OVR.

At step 1304, the method 1300 continues with loading, by the vector load-store unit, a scalar stored in a scalar register of the vector processor.

At step 1306, the method 1300 continues with comparing, by the vector processor, an element of the loaded operand vector with the loaded scalar according to a count stored in a counter. The counter can be another scalar register and a part of the vector processor. Also, in some embodiments, the method 1300 can continue with comparing, by the vector processor, an element of the loaded operand vector with another operand vector according to a count stored in a counter. In some embodiments, for the comparison, the element of the loaded operand vector is accessed by the vector processor according to a first count in a first counter, and the element of the other loaded operand vector is accessed by the vector processor according to a second count in a second counter. The comparison can be a numerical comparison.

At step 1308, the method 1300 continues with identifying whether the result of the comparison of step 1306 is TRUE or FALSE (e.g., "1" or "0"). If the result of the comparison of step 1306 is TRUE, then the method 1300 continues at step 1310*a* with storing, at the top-most unfilled position in VIR_combined, position of the element of the loaded operand vector according to the count (such as according to the count via a TRUE count stored in a TRUE counter—e.g., see TRUE counter 1416*a* depicted in FIG. 14). If the result of the comparison of step 1306 is FALSE, then the method 1300 continues at step 1310*b* with storing, at the bottom-most unfilled position in VIR_combined, position of the element of the loaded operand vector according to the count (such as according to the count via a FALSE count stored in a FALSE counter—e.g., see FALSE counter 1416*b* depicted in FIG. 14).

At step 1312, the method 1300 continues with identifying whether the count equals the vector length (VL) of the operand vector stored in the OVR. In some embodiments, the method 1300 can continue with identifying whether the VL of the OVR equals the result of adding the VL of the TRUE section of the VIR_COMBINED and the FALSE section of the VIR_COMBINED, which can be another way to identify whether the count equals the VL of the operand vector stored in the OVR. These example alternative ways of identifying whether the count equals the VL of the OVR can show that all the elements of the OVR are compared. If the count is less than the VL, then the method continues at step 1314 with incrementing the count. By incrementing the count until the count equals the VL, the vector processor can continue with storing positions of elements of the loaded operand vector according to the count until the positions of the elements of the loaded operand vector are stored in the VIR_combined. In other words, the method 1300 continues the storing of positions of elements of the loaded operand vector according to the count until the positions of the elements of the loaded operand vector are stored in the VIR_combined.

At step 1312, if the count is equal to the VL, then the method 1300 has completed the building of the indexing vector for storing in VIR_combined. The count cannot be greater than the VL because the operation of building the indexing vectors is complete upon the count being equal to the VL. When new indexing vectors are to be built, the count is reset and a VL register storing the scalar value of the VL can be reset as well. The vector processor can initially determine the vector length of an OVR and then store the length in the VL register before performing method 1300.

Upon completion of the building of the indexing vector which are stored in VIR_combined, the method 1300 continues, at step 1316, with loading from the VIR_combined, by the vector load-store unit, stored positions of the elements of the loaded operand vector. And, at step 1318, the method 1300 continues with iterating one or more vector operations over the elements of the loaded operand vector according to the loaded positions.

FIG. 14 illustrates an example system 1400 for building a combined indexing vector for storing in VIR_combined 1402, in accordance with some embodiments of the present disclosure.

The system 1400 includes the VIR_combined 1402, such as VIR_combined 1402 described in the description of method 1300. The system also includes an OVR 1404, such as the OVR described in the description of method 1300.

The system 1400 also includes a scalar register (SR) 1406, such as the scalar register described in the description of method 1300. In some embodiments, the scalar register can be replaced with another OVR addressed in a same way as the OVR 1404.

The system also includes a counter 1408, which can be partially implemented by a counter register and can be the counter described in the description of the method 1300.

The system 1400 also includes a comparator 1410 that can perform a comparison of the value stored in the SR 1406 and a value stored in an element of the OVR 1404. The comparator 1410 can perform comparisons such as OVR(i)<SR, OVR(i)=SR, OVR(i)>SR, OVR(i)≤SR, or OVR(i)≥SR. The comparator 1410 compares two numbers at a time or per cycle. At each iteration i (which also represents address or address component i), the counter 1408 provides address i for accessing the OVR 1404 for the comparison with the scalar value from SR 1406 by the comparator 1410. In short, the output of OVR 1404 at iteration or address i is compared with the value from the scalar register 1406. The comparator 1410 generates a single output, which is either TRUE or FALSE.

The comparator 1410 can be configured to perform the comparison at step 1306 of method 1300. In other words, the comparator 1410 can be configured to compare an element of a loaded operand vector with a loaded scalar according to a count stored in a counter register. The comparator 1410 can also be configured to perform the identification of a TRUE or FALSE result at step 1308. In other words, the comparator 1410 can be configured to identify whether the result of the comparison of step 1306 is TRUE or FALSE. The comparator 1410 can be configured to output a TRUE or FALSE result, such as a "1" for a TRUE result or a "0" for a FALSE result. The output of the comparator 1410 is inputted into one of the respective write enables for TRUE and FALSE sections of the VIR_COMBINED 1402.

The system 1400 also includes a separate TRUE counter 1416*a* for the addressing of the TRUE section of VIR_COMBINED 1402 and a separate FALSE counter 1416*b* for the addressing of the FALSE section of the VIR_COMBINED. The output of the comparator 1410 drives the two counters, counters 1416*a* and 1416*b*. The counters 1416*a* and 1416*b* are separate from the counter 1408 that provides the address for the OVR 1404. Output of counter TRUE 1416*a* is used as the address for accessing VIR_COMBINED 1402 from the top down. Output of FALSE counter 1416*b* is used as the address for accessing VIR_COMBINED 1402 as well, but from the bottom up. Further explanation of how the counters address the VIR_COMBINED 1402 is discussed below.

The output of counter 1408 is used as the address or address component to be written into the TRUE section at an address specified by the TRUE counter 1416*a*. This occurs when the output of the comparator 1410 is TRUE. The value stored in TRUE counter 1416*a* is increased by one for each triggering TRUE output from the comparator 1410. The output of counter 1408 is used as the address or address component to be written into the FALSE section at an address specified by the FALSE counter 1416*b*. This occurs when the output of the comparator 1410 is FALSE. The value stored in FALSE counter 1416*b* is decreased by one for each triggering FALSE output from the comparator 1410. This overall functionality of selecting where to store the addresses of the OVR components is provided by the circuit including the comparator 1410, the TRUE and FALSE counters 1416*a* and 1416*b* and the multiplexor 1420. The output from the comparator 1410 controls the multiplexor 1420 via a select register 1422.

The multiplexor 1420 controls which counter output of the counters 1416*a* and 1416*b* is received by the VIR_COMBINED 1402. The control is via the selection of either counter 1416*a* or 1416*b* and the selection is controlled via a mode value stored in the select register 1422. The select register 1422 receives the mode value from the output of the comparator 1410. With each cycle, the VIR_COMBINED 1402 is enabled once for write because the input is to the TRUE section of the VIR (e.g., addresses 0, 1, 2, . . . , count+1, wherein count begins with "0"), or the FALSE section of the VIR (e.g., addresses N−1, N−2, N−3, . . . , VIR_length−count+1, wherein count begins with "0"); and thus, the index is generated from either the top down or the bottom up. In the example shown in FIG. 14, the TRUE counter 1416*a* starts with "0" and increments by "1" with each cycle. In this example, the FALSE counter 1416*b* starts with a scalar value representing the length of the VIR_COMBINED 1402 (i.e., N−1) and decrements by "1" with each cycle. For example, in FIG. 14, the comparison by the comparator 1410 is SR<OVR(i), and thus, "2", the value at address "0" of the OVR 1404, is TRUE and therefore address "0" of the OVR is stored at address "0" of the VIR_COMBINED 1402 (or the top of the VIR). And, "5", the value at address "1" of the OVR 1404, is FALSE and therefore address "1" of the OVR is stored at address "N−1" of the VIR_COMBINED 1402 (or the bottom of the VIR). And, "3", the value at address "2" of the OVR 1404, is TRUE and therefore address "2" of the OVR is stored at address "1" of the VIR_COMBINED 1402 (or the top-most position of the VIR not filled). And, "6", the value at address "3" of the OVR 1404, is FALSE and therefore address "3" of the OVR is stored at address "N−2" of the VIR_COMBINED 1042 (or the bottom-most position of the VIR not filled).

The TRUE section and the FALSE section each are part of the output register of the system 1400. The VIR_COMBINED 1402 has at least two inputs. The first input is from the counter 1416*a* or 1416*b*, which is for the address of accessing VIR_COMBINED 1402. The second input is from the counter 1408 and this input includes the data written into the VIR_COMBINED 1402 at the address of the register provided by the counter 1416*a* or 1416*b*.

The system 1400 can be a part of a vector processor that includes a vector load-store unit. The vector load-store unit can load data stored in the registers of the system 1400 to main memory as well as store data from main memory to the registers of the system, and vice versa (load data stored in memory to the registers of system 1400 as well as store data from registers of the system to memory).

The system 1400 is also shown to include a scalar register for vector length, vector length register 1424 (VLR 1424). VLR 1424 is configured to store the vector length (VL) of the OVR 1404. A vector processor can load the VL into memory from VLR 1424 to identify whether the count from counter 1408 equals the VL of the operand vector stored in the OVR 1404. This is one way for example to implement step 1312 of method 1300 in FIG. 13. If the count is less than the VL, then the count in the counter 1408 continues to increment per clock cycle or another trigger or iteration (e.g., see step 1314). By incrementing the count until the count equals the VL, the vector processor can continue with storing positions of elements of the OVR 1404 according to the count until the positions of the elements of the OVR are stored in the TRUE section or the FALSE section of the VIR_COMBINED 1402. In other words, the system 1400 can continue with the storing of positions of elements of the OVR 1404 according to the count until the positions of the elements of the loaded operand vector are stored in the TRUE section or the FALSE section of the VIR_COMBINED 1402. This is one of the ways that the system 1400 can implement operations of the method 1300.

If the count is equal to the VL, then the vector processor using system 1400 has completed the building of indexing vectors for storing in the TRUE section or the FALSE section of the VIR_COMBINED 1402. The count cannot be greater than the VL because the operation of building the indexing vectors is complete upon the count being equal to the VL. When new indexing vectors are to be built, the count is reset in counter 1408 and VL is determined and stored in VLR 1424. The vector processor can initially determine the vector length of an OVR (e.g., OVR 1404) and then store it in the VLR 1424 before performing method 1300.

Upon completion of the building of indexing vectors which are stored in VIR_COMBINED 1402, the vector processor can continue with loading from the VIR_COMBINED, by a vector load-store unit of the processor, stored positions of the elements of the OVR 1404. And, the vector processor can also continue with iterating one or more vector operations over the elements of the OVR 1404 according to the loaded positions in the VIR_COMBINED 1402.

Figure 15:
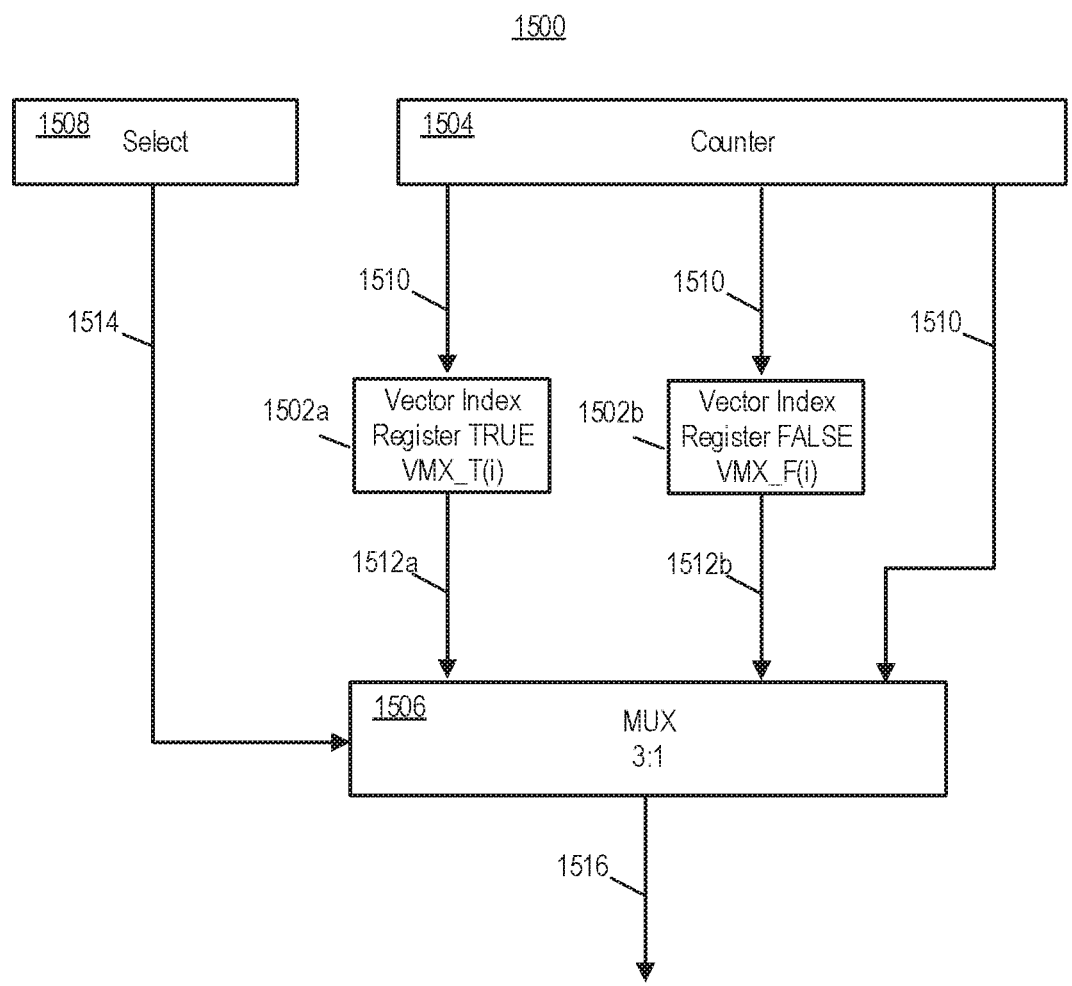
FIG. 15 illustrates an example system 1500 including a VIR_TRUE 1502a and a VIR_FALSE 1502b, in accordance with some embodiments of the present disclosure.

FIG. 15 illustrates an example system 1500 including a VIR_TRUE 1502*a* and a VIR_FALSE 1502*b*, in accordance with some embodiments of the present disclosure. For the purposes of this disclosure it is to be understood that a system similar to system 1500 can include multiple VIR_TRUEs and multiple VIR_FALSEs. For example, an embodiment similar to system 1500 with two VIR_TRUEs and two VIR_FALSEs can include a 5:1 multiplexor with four inputs to receive the two VIR_TRUEs and two VIR_FALSEs and an input to receive the input from the counter (e.g., counter similar to counter 1504). In some embodiments, the amount of VIR_TRUEs equals the amount of VIR_FALSEs in such systems.

The system 1500 can be a part of vector processor 102 (e.g., see FIG. 1 or 2) or multiple vector processors. System 1500 includes the vector index registers VIR_TRUE 1502*a* and VIR_FALSE 1502*b*, a counter register 1504, a 2:1 multiplexor 1506, and a select register 1508 connected to the multiplexor. The VIR_TRUE 1502*a* and VIR_FALSE 1502*b* can be registers of the vector registers 202 shown in FIG. 2. The counter register 1504 and the select register 1508 can be registers of the scalar registers 204. The 2:1 multiplexor 1506 can be a part of the bus 206 shown in FIG. 2 or the bus 104 shown in FIG. 1.

VIR_TRUE 1502*a* is a vector index register for TRUE results of a comparison, and is configured to store a plurality of address components corresponding to a plurality of positions in an OVR that produce TRUE results when used in a comparison. For example, see VIR_TRUE 1202*a*, which can be part of system 1500.

VIR_FALSE 1502*b* is a vector index register for FALSE results of a comparison, and is configured to store a plurality of address components corresponding to a plurality of positions in an OVR that produce FALSE results when used in a comparison. For example, see VIR_FALSE 1202*b*, which can be part of system 1500.

Each address component can be addable to an effective address for accessing a corresponding position in the OVR. Each position of the OVR can include an element of the operand vector to be operated upon by the ALU. For example, the system 1500 can be part of a vector processor that includes an arithmetic logic unit (ALU) of a plurality of arithmetic logic units (ALUs). The vector processor can also include an operand vector register (OVR) of a plurality of operand vector registers. The OVR can be configured to store elements of an operand vector to be used as input for a vector operation of the ALU.

As shown, the counter register 1504 is part of the system 1500. The counter register 1504 can also be a part of the vector processor having the system 1500. The counter register 1504 can be configured to store a count 1510. The count 1510 can be addable to an effective address for accessing the OVR or the count can be used by the vector processor for iterating on the plurality of address components stored in the VIR 1502.

As shown, the 3:1 multiplexor 1506 is part of the system 1500. The 3:1 multiplexor 1506 can also be a part of the vector processor having the system 1500. The 3:1 multiplexor 1506 can be configured to receive, as inputs, the count 1510 from the counter register 1504 and respective outputs 1512*a* and 1512*b* from the VIRs 1502*a* and 1502*b*. The outputs 1512*a* and 1512*b* from the VIRs 1502*a* and 1502*b* can include one of the plurality of address components of the VIRs corresponding to the count 1510. The 3:1 multiplexor 1506 can also be configured to receive, as a selection input, a mode value 1514. The mode value 1514 can be or include a value for selection of the count 1510 or a value for selection of one of the outputs 1512*a* or 1512*b* from the VIRs 1502*a* and 1502*b*. The 3:1 multiplexor 1506 can also be configured to select either the count 1510 or one of the outputs 1512*a* or 1512*b* from the VIRs 1502*a* and 1502*b* according to the received mode value 1514. The 3:1 multiplexor 1506 can also be configured to output and communicate, via a bus (such as one of the buses of FIG. 1 or 2), a selection output 1516 that is the selected count or one of the selected outputs from the VIRs. The selection output 1516 can be communicated to a requester accessing the OVR for the ALU. The requester can be a vector load-store unit of the vector processor (e.g., see vector load-store unit 210 shown in FIG. 2), or a vector load-store unit of another vector processor.

Figure 16:
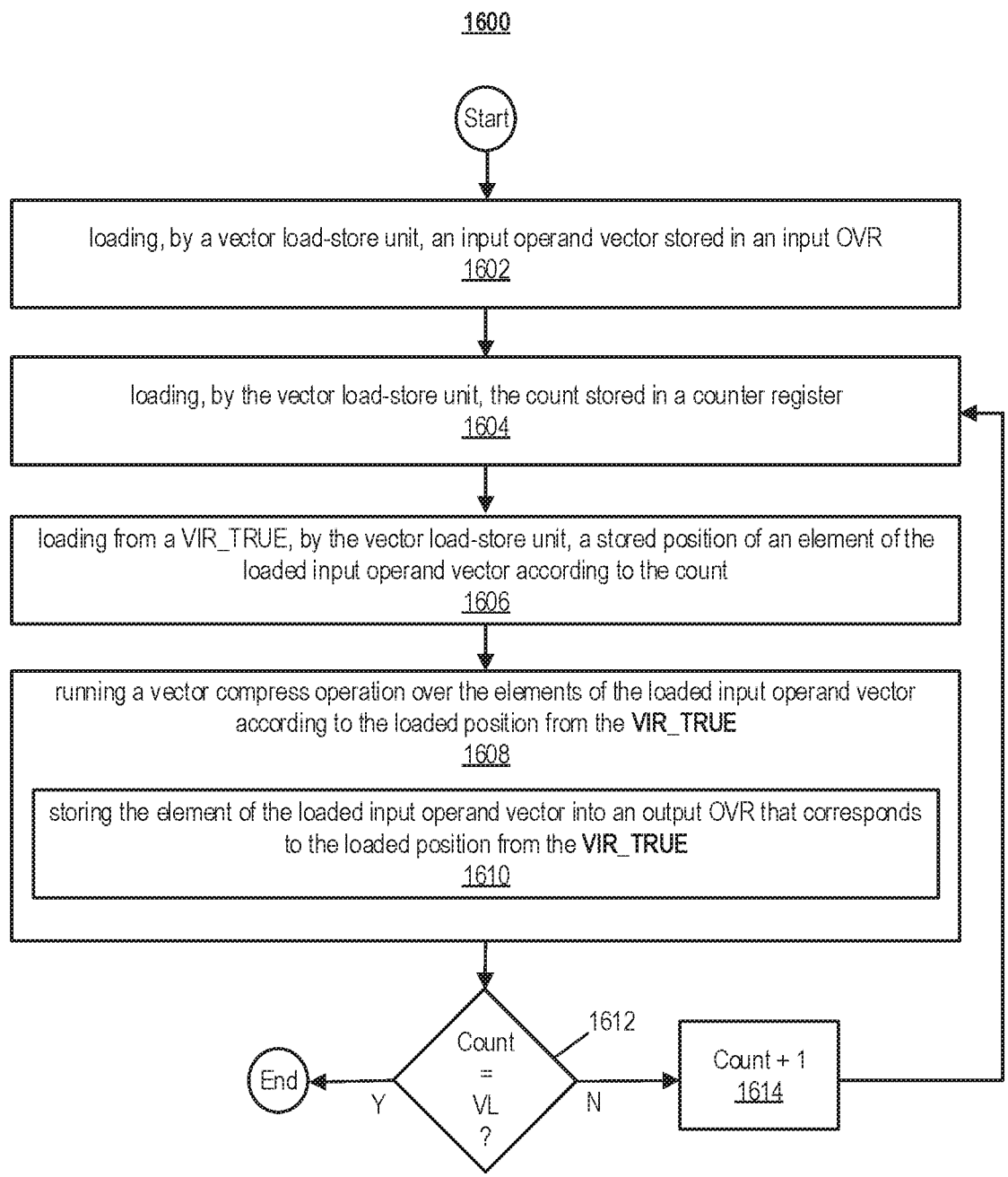
FIG. 16 illustrates example operations of method 1600 for compressing elements of an operand vector according to a VIR_TRUE, in accordance with some embodiments of the present disclosure.

FIG. 16 illustrates example operations of method 1600 for compressing elements of an operand vector according to a VIR_TRUE (e.g., see VIR_TRUE 1202*a* or 1502*a*), in accordance with some embodiments of the present disclosure. Alternatively, the example operations of method 1600 for compressing elements of an operand vector can be according to a VIR_FALSE (e.g., see VIR_FALSE 1202*b* or 1502*b*) or a TRUE or FALSE section of a VIR_COMBINED (e.g., see VIR_COMBINED 1402), in accordance with some embodiments of the present disclosure.

In FIG. 16, the method 1600 begins at step 1602, with loading, by a vector load-store unit, an input operand vector stored in an input OVR. At step 1604, the method 1600 continues with loading, by the vector load-store unit, the count stored in a counter register. At step 1606, the method 1600 continues with loading from a VIR_TRUE, by the vector load-store unit, a stored position of an element of the loaded input operand vector according to the count. At step 1608, the method 1600 continues with running a vector compress operation over the elements of the loaded input operand vector according to the loaded position from the VIR_TRUE. Step 1608 includes step 1610 that includes the method 1600 continuing with storing the element of the loaded input operand vector into an output OVR that corresponds to the loaded position from the VIR_TRUE. At step 1612, the method 1600 continues with comparing the count to a value representing the vector length of the VIR_TRUE (i.e., VL) such that the vector compress operation can be iterated over the input OVR for each of the positions stored in the VIR_TRUE. When the count equals the vector length of the VIR_TRUE, then the method 1600 ends. When the count is less than the vector length of the VIR_TRUE, then the method 1600 continues with incrementing the count at 1614 and then returning to step 1604 (loading the count stored in a counter register) which is followed by steps 1606 (loading from a VIR_TRUE, by the vector load-store unit, a stored position of an element of the loaded input operand vector according to the count) and 1608 (running the vector compress operation over the elements of the loaded input operand vector according to the loaded position from the VIR_TRUE). This way the vector compress operation is iterated over the input OVR for each of the positions stored in the VIR_TRUE.

Figure 17:
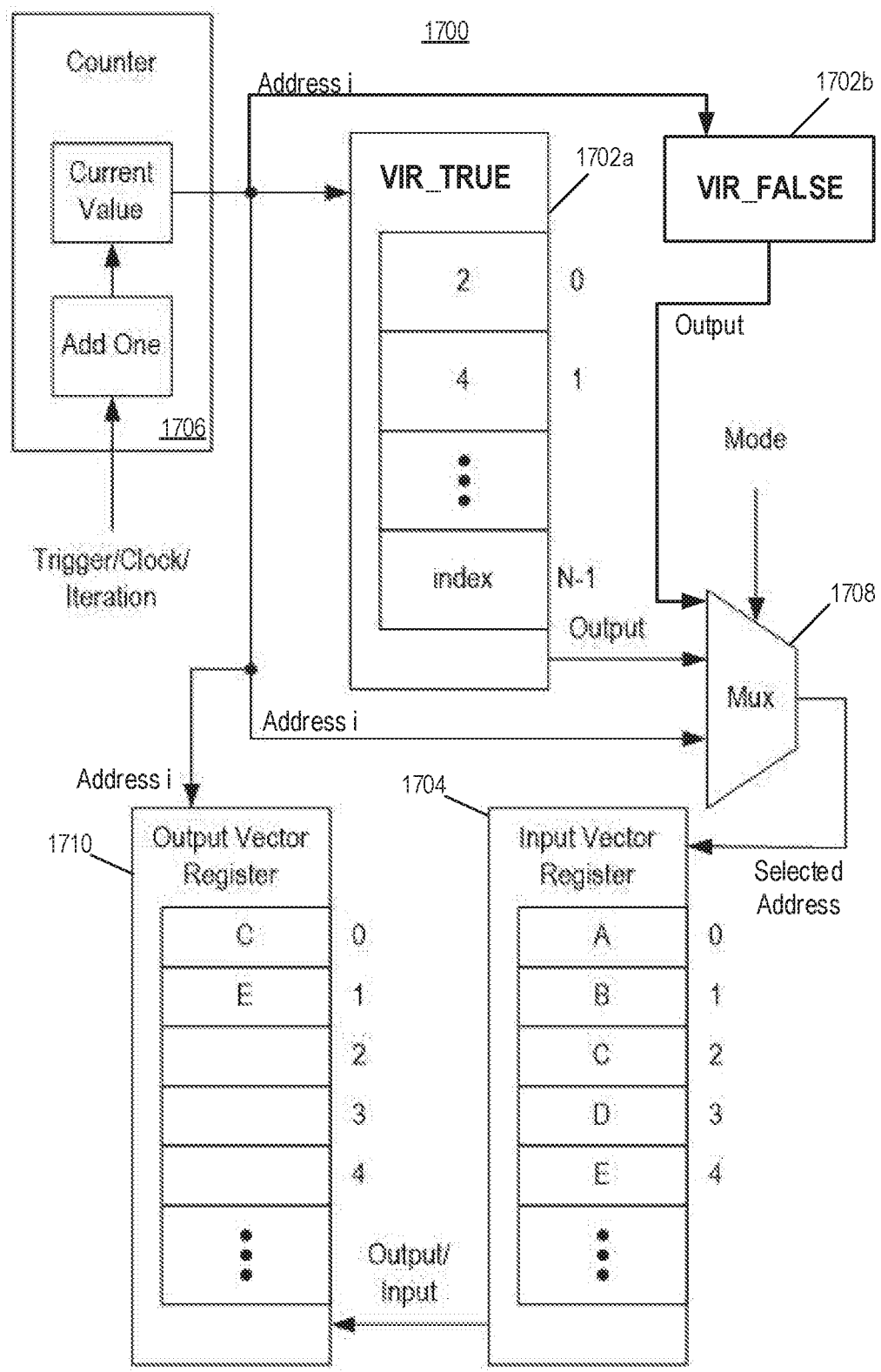
FIG. 17 illustrates an example system 1700 including a VIR_TRUE 1702a being used for compressing elements of an input operand vector stored in an input OVR 1704, in accordance with some embodiments of the present disclosure.

FIG. 17 illustrates an example system 1700 including a VIR_TRUE 1702*a* (which can be similar to VIR_TRUE 1202*a* or 1502*a*) being used for compressing elements of an input operand vector stored in an input OVR 1704, in accordance with some embodiments of the present disclosure. Alternatively, the example system 1700 can be used to compress elements of an operand vector according to a VIR_FALSE 1702*b* (which can be similar to VIR_FALSE 1202*b* or 1502*b*), in accordance with some embodiments of the present disclosure. Also, the example system 1700 can be used to compress elements of an operand vector according to a TRUE or FALSE section of a VIR_COMBINED (e.g., see VIR_COMBINED 1402), in accordance with some embodiments of the present disclosure.

Example system 1700 is one example of a system that can implement at least method 1600.

In FIG. 17, the VIR_TRUE 1702a stores a list of positions of the input OVR 1704 (e.g., "2" as the input OVR's first element, and "4" as the input OVR's second element"). In this illustrated example, it is shown that the vector processor runs for two cycles or iterations of a vector compress operation. At the first iteration, counter 1706 outputs the count of "0" which is the value stored in the counter at the first cycle. In the first cycle, VIR_TRUE 1702a is shown outputting "2". The multiplexor 1708 selects between the address component ("0") as specified by the counter 1706 in a normal mode operation or the address component ("2") as specified by the VIR_TRUE 1702a in a VIR_TRUE mode of operation (or a compress mode of operation based on contents of the VIR_TRUE 1702a in this specific example). When the VIR_TRUE (or VIR_TRUE compress mode) is selected by the multiplexor 1708 in the first cycle the output of "2" from the VIR_TRUE 1702a is the address component used for accessing the input OVR 1704. As a result, the input OVR 1704 is accessed for an output of element "C" at position "2" of the input OVR. The output OVR 1710 is addressed directly though the count stored in the counter 1706. Since the count of the counter 1706 is "0" in the first cycle, the output ORV 1710 stores "C" as its first element. In the next iteration or cycle, the output ORV 1710 stores "E" as a second element at position "1" of the output OVR. In this example with two cycles show, the input OVR 1704 having elements of {A, B, C, D, E} is compressed into the output OVR 1710 having elements of {C, E}.

Also, in reference to FIG. 17, if the address signals for the input/output vectors are reversed, {C, E} can be expanded into a second output OVR having element of {x, x, C, x, E} where x is the existing values before the compress operation or a scalar value selected from a scalar register (e.g., see FIG. 9 which is an example method expanding a compressed vector with a scalar value from a scalar register).

Further, if a value from a VFR is added to the count of the counter, the summation can be used so that the first iteration of an operation on the input OVR occurs at another position of the input OVR instead of the first position of the input OVR (e.g., the first position of input OVR 1704 is labeled "0"). E.g., see FIG. 5. Alternatively, the VIR_TRUE 1702a can be used to provide an input for the count register so that the initial value of the count register at the beginning of a vector operation is the value stored in the VIR_TRUE 1702a. Such options allow for vector first processing. It is to be understood, the for different types of operations the VIR_FALSE 1702b could be used instead of VIR_TRUE 1702a. For example, a compress operation could be based on the index in VIR_FALSE 1702b instead of VIR_TRUE 1702a. Also, a VIR_COMBINED can replace VIR_FALSE 1702b and VIR_FALSE 1702b in the system 1700.

The methods 600, 700, 900, 1000, 1100, 1300, and 1600 include just some of the many operations that can be implemented by the vector processors and systems described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be partially provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A method, comprising:
loading, by a vector load-store unit of a vector processor, an operand vector stored in an operand vector register;
loading, by the vector load-store unit, a scalar stored in a scalar register;

determining a vector length of the loaded operand vector register;
loading a count stored in a counter register;
until the count equals the vector length of the loaded operand vector register,
  comparing, by the vector processor, an element of the loaded operand vector with the loaded scalar, wherein the element is selected according to the count;
  based on the comparing:
    storing, by the vector processor, a position of the element of the loaded operand vector according to the count in a first vector index register in response to the element of the loaded operand vector matching the loaded scalar, and
    storing, by the vector processor, the position of the element of the loaded operand vector according to the count in a second vector index register in response to the element of the loaded operand vector not matching the loaded scalar; and
  incrementing the count.

2. The method of claim 1, further comprising:
loading from at least one of the first vector index register, or the second vector index register, or a combination thereof, by the vector load-store unit, stored positions of the elements of the loaded operand vector; and
iterating one or more vector operations over the elements of the loaded operand vector according to the loaded positions.

3. The method of claim 1, further comprising:
loading an input operand vector stored in an input operand vector register;
loading a count from a second counter register;
loading, from the first vector index register, a stored position of an element of the loaded operand vector according to the count from the second counter register; and
storing the element of the loaded input operand vector into an output operand vector register that corresponds to the loaded position from the first vector index register, as part of a vector operation.

4. The method of claim 3, wherein the vector operation is a compress operation, and wherein the method further comprises storing the element of the loaded input operand vector into an output operand vector register that corresponds to loaded positions stored in the first vector index register.

5. The method of claim 4, further comprising:
loading the stored elements from the output operand vector register;
iterating a second vector operation over the stored elements from the output operand vector register according to the loaded positions stored in the first vector index register, wherein the second vector operation is an expand operation; and
storing, according to the expand operation, the stored elements from the output operand vector register into a second output operand vector register at positions of the second output operand vector register according to the loaded positions stored in the first vector index register.

6. The method of claim 5, further comprising storing, according to the expand operation, a scalar into the second output operand vector register at other positions of the second output operand vector register.

7. The method of claim 6, further comprising:
iterating a second compress operation over elements of the loaded operand vector according to loaded positions stored in the second vector index register;
storing the elements of the loaded operand vector into a third output operand vector register that correspond to the loaded positions stored in the second vector index register; and
performing one or more vector operations using the elements from the second output operand vector register and the third output operand vector register.

8. The method of claim 6, further comprising:
iterating a second compress operation over elements of a second loaded operand vector according to loaded positions stored in a third vector index register;
storing the elements of the second loaded operand vector into a third output operand vector register that correspond to the loaded positions stored in the third vector index register; and
performing one or more vector operations using the elements from the second output operand vector register and the third output operand vector register.

9. A system, comprising:
a vector processor, configured to compare an element of a loaded operand vector with a loaded scalar, wherein the element is selected according to a count stored in a counter register of the vector processor;
an operand vector register of the vector processor configured to store an operand vector;
a scalar register of the vector processor configured to store a scalar; and
a vector load-store unit of the vector processor, configured to:
  load an operand vector stored in the operand vector register;
  load a scalar stored in the scalar register;
  compare an element of the loaded operand vector with the loaded scalar, wherein the element is selected according to the count;
  based on the comparison:
    store, by the vector processor, a position of the element of the loaded operand vector according to the count in a first vector index register in response to the element of the loaded operand vector matching the loaded scalar, and
    store, by the vector processor, the position of the element of the loaded operand vector according to the count in a second vector index register in response to the element of the loaded operand vector not matching the loaded scalar; and
  increment the count.

10. The system of claim 9, wherein the vector load-store unit is configured to load from at least one of the first vector index register, or the second vector index register, or a combination thereof, by stored positions of the elements of the loaded operand vector, and wherein the vector processor is configured to iterate one or more vector operations over the elements of the loaded operand vector according to the loaded positions.

11. The system of claim 9, wherein the vector load-store unit is configured to:
load an input operand vector stored in an input operand vector register of the vector processor;
load a count from a second counter register of the vector processor;
load, from the first vector index register, a stored position of an element of the loaded operand vector according to the count from the second counter register; and store the element of the loaded input operand vector into an output operand vector register that corresponds to the loaded position from the first vector index register, as part of a vector operation.

12. The system of claim 11, wherein the vector operation is a compress operation, and wherein the vector load-store unit is configured to store the element of the loaded input operand vector into the output operand vector register that corresponds to loaded positions stored in the first vector index register.

13. The system of claim 12, wherein the vector load-store unit is configured to load the stored elements from the output operand vector register, wherein the vector processor is configured to iterate a second vector operation over the stored elements from the output operand vector register according to the loaded positions stored in the first vector index register, wherein the second vector operation is an expand operation, and wherein the vector load-store unit is further configured to store, according to the expand operation, the stored elements from the output operand vector register into a second output operand vector register of the vector processor at positions of the second output operand vector register according to the loaded positions stored in the first vector index register.

14. The system of claim 13, wherein the vector load-store unit is configured to store, according to the expand operation, a scalar into the second output operand vector register at other positions of the second output operand vector register.

15. The system of claim 14, wherein the vector processor is configured to iterate a second compress operation over elements of the loaded operand vector according to loaded positions stored in the second vector index register, wherein the vector load-store unit is configured to store the elements of the loaded operand vector into a third output operand vector register that correspond to the loaded positions stored in the second vector index register,
wherein the vector processor is further configured to perform one or more vector operations using the elements from the second output operand vector register and the third output operand vector register.

16. A vector processor, comprising:
an arithmetic logic unit (ALU) of a plurality of arithmetic logic units;
an operand vector register of a plurality of operand vector registers, configured to store elements of an operand vector to be used as input for a vector operation of the ALU;
a first vector index register, configured to store a plurality of address components corresponding to a plurality of positions in the operand vector register that match a scalar stored in a scalar register when used in a comparison;
a second vector index register, configured to store a plurality of address components corresponding to a plurality of positions in the operand vector register that do not match the scalar stored in the scalar register when used in the comparison,
each address component addable to an effective address for accessing a corresponding position in the operand vector register, and
each position of the operand vector register comprises an element of the operand vector to be operated upon by the ALU,
wherein the vector processor configured to:
load the operand vector stored in the operand vector register;
load a scalar stored in a scalar register;
compare an element of the loaded operand vector with the loaded scalar, wherein the element is selected according to a count;
based on the comparison:
store a position of the element of the loaded operand vector according to the count in the first vector index register in response to the element of the loaded operand vector matching the loaded scalar, and
store the position of the element of the loaded operand vector according to the count in the second vector index register in response to the element of the loaded operand vector not matching the loaded scalar; and
increment the count.

* * * * *